(12) United States Patent
Lee et al.

(10) Patent No.: US 10,877,645 B2
(45) Date of Patent: Dec. 29, 2020

(54) ELECTRONIC DEVICE AND OPERATING METHOD THEREOF

(71) Applicant: SAMSUNG ELECTRONICS CO., LTD., Suwon-si (KR)

(72) Inventors: Haein Lee, Suwon-si (KR); Hyemin Lee, Suwon-si (KR); Heejun Kang, Suwon-si (KR); Jungsun Park, Suwon-si (KR); Jihun Yoon, Suwon-si (KR); Seokho Ban, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/299,963

(22) Filed: Mar. 12, 2019

(65) Prior Publication Data
US 2019/0332250 A1 Oct. 31, 2019

(30) Foreign Application Priority Data
Apr. 30, 2018 (KR) .................. 10-2018-0050187

(51) Int. Cl.
*G06F 3/048* (2013.01)
*G06F 3/0484* (2013.01)
(Continued)

(52) U.S. Cl.
CPC ...... *G06F 3/04842* (2013.01); *G06F 3/04817* (2013.01); *G06F 3/04886* (2013.01); *G06F 9/3004* (2013.01)

(58) Field of Classification Search
CPC ............ G06F 3/04842; G06F 3/04817; G06F 3/04886; G06F 9/3004
See application file for complete search history.

(56) References Cited

U.S. PATENT DOCUMENTS 6,323,859 B1 * 11/2001 Gantt .................. G06T 19/20
345/419
6,462,733 B1 * 10/2002 Murakami ............ G06F 3/033
345/156
(Continued)

FOREIGN PATENT DOCUMENTS

EP 2996089 A1 3/2016
KR 10-2011-0107692 A 10/2011
(Continued)

OTHER PUBLICATIONS

Communication dated Aug. 26, 2019, issued by the European Patent Office in counterpart European Application No. 19161679.6.
(Continued)

*Primary Examiner* — Nicholas Augustine
(74) *Attorney, Agent, or Firm* — Sughrue Mion, PLLC

(57) ABSTRACT

An electronic device and an operating method thereof are provided. The electronic device includes: a display; a user input interface; a memory configured to store one or more instructions; and a processor configured to execute the stored one or more instructions to perform control operations such that an image obtained by photographing an actual space to be monitored is displayed on the display, a three-dimensional (3D) box is generated based on at least one point included in the image, a size and/or a position of the 3D box are adjusted based on a user input received through the user input interface, and an interactive region corresponding to the 3D box is set in the actual space.

17 Claims, 22 Drawing Sheets

(51) Int. Cl.
*G06F 3/0481* (2013.01)
*G06F 3/0488* (2013.01)
*G06F 9/30* (2018.01)
*G06F 3/01* (2006.01)

(56) References Cited

U.S. PATENT DOCUMENTS

| | | | | |
|---|---|---|---|---|
| 7,508,377 B2* | 3/2009 | Pihlaja | ............ | G06F 3/0338 345/156 |
| 8,405,604 B2* | 3/2013 | Pryor | ............ | G16H 50/50 345/156 |
| 8,514,221 B2* | 8/2013 | King | ............ | G06T 19/00 345/419 |
| 9,104,271 B1* | 8/2015 | Adams | ............ | G06F 3/014 |
| 9,996,797 B1* | 6/2018 | Holz | ............ | G06F 3/04842 |
| 10,168,873 B1* | 1/2019 | Holz | ............ | G06F 3/0213 |
| 2005/0195156 A1* | 9/2005 | Pihlaja | ............ | G06F 3/03547 345/156 |
| 2006/0187196 A1* | 8/2006 | Underkoffler | ............ | G06K 9/00375 345/156 |
| 2008/0122786 A1* | 5/2008 | Pryor | ............ | A63F 13/04 345/156 |
| 2009/0031240 A1* | 1/2009 | Hildreth | ............ | G06F 3/017 715/772 |
| 2009/0295976 A1 | 12/2009 | Choi | | |
| 2010/0053151 A1* | 3/2010 | Marti | ............ | G06F 3/017 345/419 |
| 2010/0149096 A1* | 6/2010 | Migos | ............ | G06F 3/04883 345/158 |
| 2010/0234094 A1* | 9/2010 | Gagner | ............ | G07F 17/32 463/20 |
| 2012/0249429 A1* | 10/2012 | Anderson | ............ | G06F 3/017 345/173 |
| 2012/0257025 A1 | 10/2012 | Kim et al. | | |
| 2012/0268364 A1* | 10/2012 | Minnen | ............ | G06F 3/0304 345/156 |
| 2012/0275686 A1* | 11/2012 | Wilson | ............ | G06K 9/00355 382/154 |
| 2012/0290950 A1* | 11/2012 | Rapaport | ............ | H04N 21/8358 715/753 |
| 2013/0009865 A1 | 1/2013 | Valik et al. | | |
| 2013/0120297 A1* | 5/2013 | Merritt | ............ | A61B 5/0066 345/173 |
| 2015/0199022 A1* | 7/2015 | Gottesman | ............ | G06F 3/017 382/103 |
| 2015/0355805 A1* | 12/2015 | Chandler | ............ | G06F 3/04842 715/784 |
| 2017/0054569 A1 | 2/2017 | Harms et al. | | |
| 2017/0177087 A1* | 6/2017 | Lerner | ............ | G06F 3/0304 |
| 2017/0287230 A1* | 10/2017 | Gortler | ............ | G06F 3/04815 |
| 2018/0323992 A1 | 11/2018 | Harms et al. | | |

FOREIGN PATENT DOCUMENTS

| | | |
|---|---|---|
| KR | 10-2017-0022912 A | 3/2017 |
| WO | 2017165705 A1 | 9/2017 |

OTHER PUBLICATIONS

International Search Report (PCT/ISA/210) dated Jun. 21, 2019, issued by International Searching Authority in counterpart International Application No. PCT/KR2019/003039.

* cited by examiner

ELECTRONIC DEVICE AND OPERATING METHOD THEREOF

CROSS-REFERENCE TO RELATED APPLICATION(S)

This application is based on and claims priority under 35 U.S.C. § 119 to Korean Patent Application No. 10-2018-0050187, filed on Apr. 30, 2018, in the Korean Intellectual Property Office, the disclosure of which is incorporated by reference herein in its entirety.

BACKGROUND

1. Field

The disclosure relates to an electronic device and an operating method thereof, and more particularly, to an electronic device capable of setting an interactive region for detecting an event in an interactive system and an operating method thereof.

2. Description of Related Art

An interactive system may include a monitoring device capable of monitoring an interactive region. The monitoring device may monitor the interactive region by using a depth sensor. The depth sensor may generate a depth image indicating a depth of a corresponding region. The depth image may be generated by stereo triangulation, an optical triangulation sheet, structural light, interferometry, coded aperture, or the like.

The interactive system may set an interactive region in an actual space and monitor whether an event has occurred in the set interactive region.

SUMMARY

Provided are an electronic device for providing a user interface capable of setting an interactive region based on an image obtained by photographing an actual space and an operating method thereof.

Additional aspects will be set forth in part in the description which follows and, in part, will be apparent from the description, or may be learned by practice of the presented embodiments.

According to an embodiment of the disclosure, an electronic device includes: a display; a user input interface; a memory configured to store one or more instructions; and at least one processor configured to execute the one or more instructions stored in the memory, to: control to display, on the display, a captured image of an actual space to be monitored, determine a three-dimensional (3D) box based on at least one point included in the captured image, adjust at least one of a size and a position of the 3D box based on a user input received through the user input interface, and set an interactive region corresponding to the 3D box in the actual space.

According to another embodiment of the disclosure, an operating method of an electronic device includes: controlling to display, on a display, a captured image of an actual space to be monitored; determining a three-dimensional (3D) box based on at least one point included in the captured image; adjusting at least one of a size and a position of the 3D box based on a user input; and setting, in the actual space, an interactive region corresponding to the 3D box.

According to another embodiment of the disclosure, a non-transitory computer-readable recording medium includes a program recorded thereon for executing, in a computer, the operating method of the electronic device.

According to another embodiment of the disclosure, an electronic device includes: a memory configured to store one or more instructions; and at least one processor configured to execute the one or more instructions stored in the memory, to: control to output, for display, a captured image of an actual space to be monitored, determine a three-dimensional (3D) box based on at least one point included in the captured image, adjust at least one of a size and a position of the 3D box based on a user input relative to the displayed image, and determine an interactive region corresponding to the 3D box in the actual space.

According to another embodiment of the disclosure, an operating method of a display device includes: transmitting, to an electronic device, a captured image of an actual space to be monitored; receiving, from the electronic device, information on a three-dimensional interactive region in the actual space, and content to be executed or output based on an event being detected in the interactive region; monitoring the interactive region; and controlling to execute or output the content based on an event detected in the monitored interactive region.

According to another embodiment of the disclosure, a non-transitory computer-readable recording medium includes a program recorded thereon for executing, in a computer, the operating method of the display device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
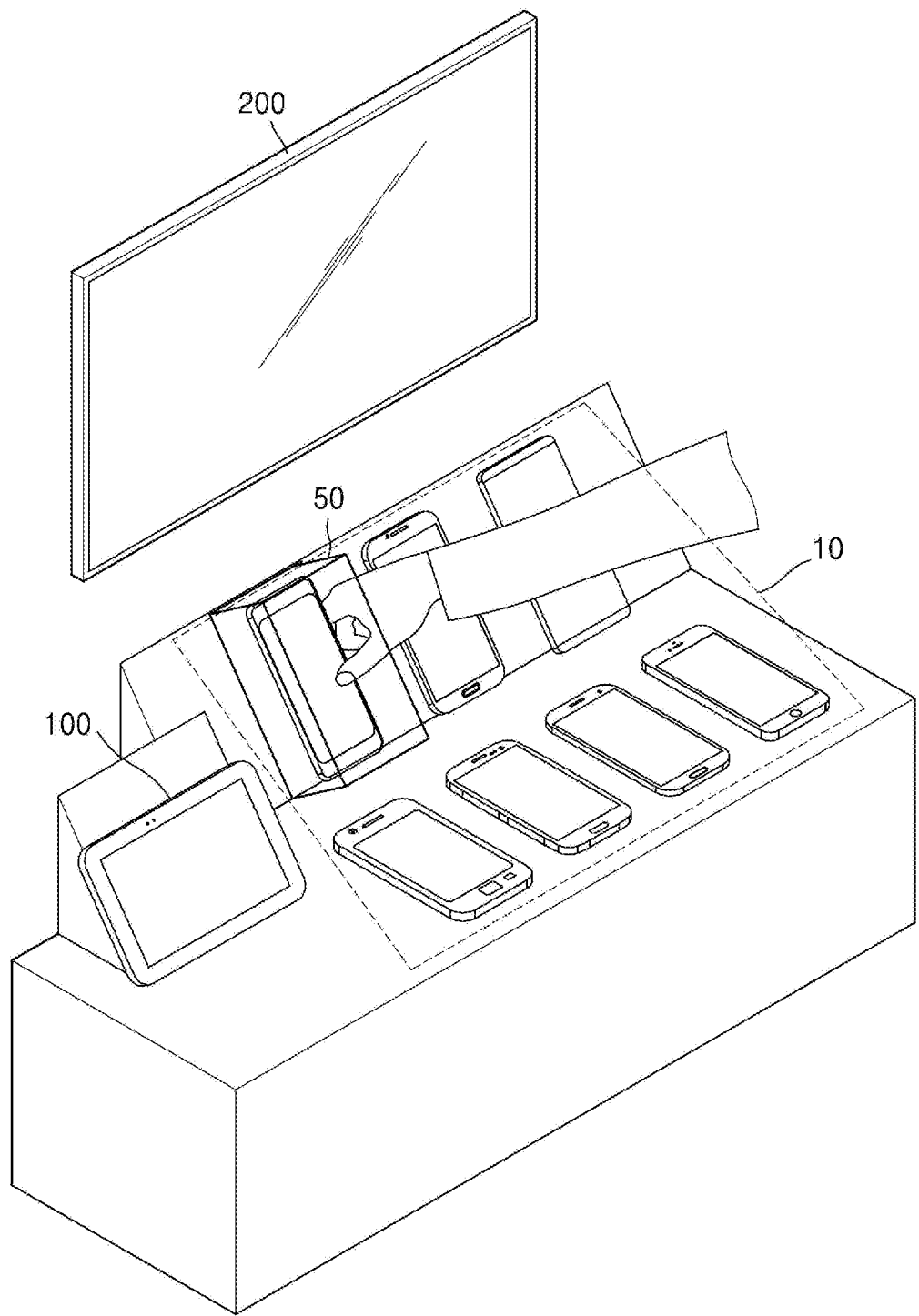
FIG. 1 illustrates an interactive system according to an embodiment.

The terminology used in the disclosure is used only to describe specific embodiments and does not have any intention to limit the disclosure. The terms used herein are those general terms as currently understood in the art, but some terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

Throughout the specification, when a component "includes" an element, unless specified otherwise, it should be understood that the component does not exclude another element but may further include another element. In addition, terms such as " . . . unit", " . . . module", and the like refer to units that perform at least one function or operation, and the units may be implemented as hardware or software or as a combination of hardware and software.

Reference will now be made in detail to embodiments, examples of which are illustrated in the accompanying drawings, wherein generally understood parts may be omitted to clearly describe embodiments. Further, like reference numerals denote like elements throughout the specification. In this regard, embodiments may have different forms and should not be construed as being limited to the descriptions set forth herein. Accordingly, certain embodiments are specifically described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

FIG. 1 illustrates an interactive system according to an embodiment. The interactive system according to an embodiment may include an electronic device 100 and a display device 200.

The electronic device 100 according to an embodiment may be implemented in various forms. For example, the electronic device 100 may be implemented by various electronic devices such as a cellular phone, a smartphone, a laptop computer, a desktop personal computer (PC), a tablet PC, an e-book terminal, a digital broadcast terminal, a personal digital assistant (PDA), a portable multimedia player (PMP), a navigation machine, an MP3 player, a camcorder, an Internet protocol television (IPTV), a digital television (DTV), a wearable device, etc. However, it is understood that the electronic device 100 is not limited thereto.

In addition, the display device 200 according to an embodiment may be a signage or a TV, but this is only illustrative, and the display device 200 may be implemented by any electronic device including a display. For example, the display device 200 may be implemented by various electronic devices such as a cellular phone, a tablet PC, a digital camera, a camcorder, a laptop computer, a desktop PC, an e-book terminal, a digital broadcast terminal, a PDA, a PMP, a navigation machine, an MP3 player, a wearable device, etc. By way of example, embodiments may be implemented in a display device having a large display, such as a signage or a TV, but are not limited thereto. In addition, the display device 200 may be a stationary type or a mobile type and may be a digital broadcast receiver capable of receiving a digital broadcast signal.

The term "user" in this specification indicates a person who controls a function or operation of an electronic device, a display device, an Internet of Things (IoT) device, or the like and may include a manager or an installation engineer, or a consumer or general user.

The electronic device 100 and the display device 200, according to an embodiment, may communicate with each other. For example, the electronic device 100 may transmit or receive data, a signal, or the like to or from the display device 200 by using short-range communication. The short-range communication may include a Wi-Fi scheme, a near-field communication (NFC) scheme, a Bluetooth scheme, an infrared data association (IrDA) scheme, a Zigbee scheme, and the like, but is not limited thereto.

According to an embodiment, the electronic device 100 may acquire an image by photographing (or capturing an image of) an actual space 10 to be monitored. The electronic device 100 may use a camera included in the electronic device 100 to acquire an image by photographing a space to be monitored. Alternatively, the electronic device 100 may receive an image captured by an external device, by communicating with the external device. For example, according to an embodiment, the display device 200 may photograph the actual space 10 to be monitored, which may be located in front of the display device 200, by using a camera embedded in the display device 200, a camera separately provided on the display device 200, a camera connected to the display device 200, etc. The display device 200 may transmit a captured image to the electronic device 100 by communicating with the electronic device 100.

According to an embodiment, the electronic device 100 may set at least one interactive region 50 in the actual space 10 based on the image obtained by photographing the actual space 10. For example, the electronic device 100 may display, on a display, the image obtained by photographing the actual space 10 and generate (or determine) a three-dimensional (3D) box (e.g., virtual 3D box or space) based on at least one point included in the image. The electronic device 100 may adjust a size and/or a position of the 3D box based on a user input and set, in the actual space 10, the interactive region 50 corresponding to the 3D box.

In addition, the electronic device 100 may set or determine at least one piece of content corresponding to the generated 3D box, and control the display device 200 such that the display device 200 displays the set content when the occurrence of an event in the interactive region 50 is detected. In this case, the event may include an event that an object is detected in the interactive region 50, an event that an object is not detected in the interactive region 50, an event that a motion of an object in the interactive region 50 is detected, an event that a particular motion in the interactive region 50 is detected, or the like, but is not limited thereto. That is, in various embodiments, various events may be used or considered.

According to an embodiment, the electronic device 100 may transmit at least one of information on the set 3D box (information on the interactive region 50), information on the event, and content information corresponding to the 3D box (the interactive region 50) to the display device 200.

According to an embodiment, the display device 200 may determine the interactive region 50 in the actual space 10 based on the information on the 3D box (e.g., coordinate value information and the like of the 3D box). In addition, the display device 200 may monitor whether an event occurs in the interactive region 50, based on the event information. For example, the display device 200 may monitor whether an object is detected in the interactive region 50, based on information on "an event that an object is detected." In addition, the display device 200 may display when an event occurs (e.g., an object is detected) in the interactive region 50, based on the content information.

Figure 2:
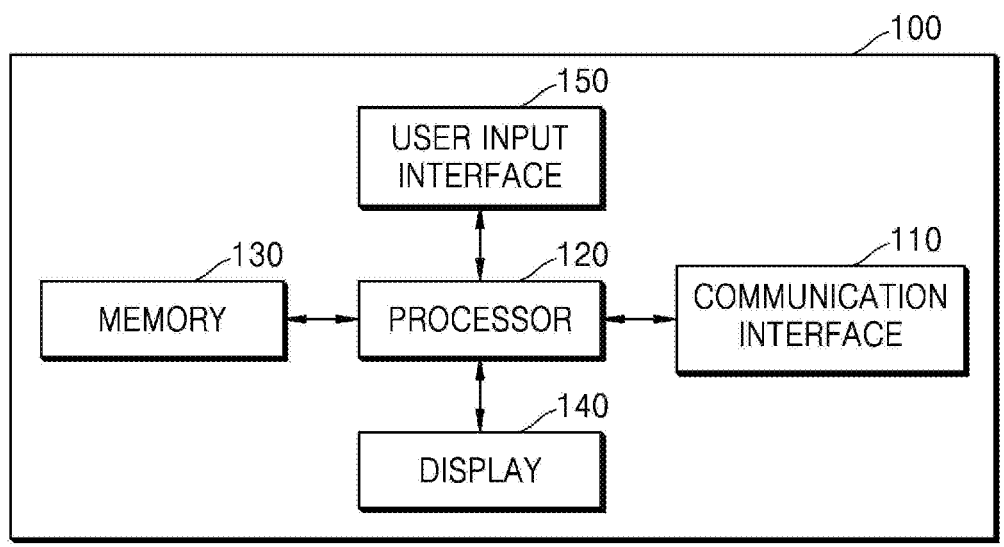
FIG. 2 is a block diagram of an electronic device according to an embodiment.

FIG. 2 is a block diagram of the electronic device 100 according to an embodiment.

Referring to FIG. 2, the electronic device 100 according to an embodiment may include a communication interface 110, a processor 120, a memory 130, a display 140, and a user input interface 150.

According to an embodiment, the communication interface 110 may include at least one component for communicating between the electronic device 100 and an external device (e.g., a display device, a server, or the like).

The communication interface 110 may include one or more components (e.g., circuitry, hardware, transceiver, etc.) for communication through a local area network (LAN), a wide area network (WAN), a value added network (VAN), a mobile radio communication network, a satellite communication network, a radio frequency transmission, etc., taken alone or in combination. In addition, the communication interface 110 may directly transmit and receive data or a signal to and from an external device or an external server in a wireless manner by using a wireless LAN (WLAN) (e.g., Wi-Fi) or the like.

For example, the communication interface 110 may receive, from an external device, an image obtained by photographing an actual space to be monitored. In addition, the communication interface 110 may transmit information on an interactive region, event information, content information, and the like to the display device 200.

According to an embodiment, the processor 120 may execute one or more programs (or instructions) stored in the memory 130. The processor 120 may include a single core, dual cores, triple cores, quadruple cores, or a multiple number of cores thereof. In addition, the processor 120 may include a plurality of processors. For example, the processor 120 may be implemented by a main processor and a sub-processor operating in a sleep mode.

According to an embodiment, the memory 130 may store various data, programs, or applications for operating and controlling the electronic device 100.

In addition, a program stored in the memory 130 may include one or more instructions. The program (one or more instructions) or application stored in the memory 130 may be executed by the processor 120.

According to an embodiment, the processor 120 may display, on the display 140, the image obtained by photographing the actual space to be monitored. In this case, the image displayed on the display 140 may be an image three-dimensionally expressing the actual space based on depth value information of objects included in the actual space. In addition, the processor 120 may generate a 3D box based on at least one point included in the image. The processor 120 may adjust a size and/or a position of the generated 3D box based on a user input received through the user input interface 150. The processor 120 may control so that an interactive region corresponding to the 3D box is set in the photographed actual space. In addition, the processor 120 may set an event and content corresponding to the 3D box and control so that corresponding content is executed or provided when an event occurs (or is detected) in the interactive region.

According to an embodiment, the display 140 generates a driving signal by converting at least one of an image signal, a data signal, an on screen display (OSD) signal, a control signal, or the like processed by the processor 120. The display 140 may be implemented by a plasma display panel (PDP), a liquid crystal display (LCD), an organic light-emitting diode (OLED), a flexible display, etc., and may also be implemented by a 3D display. Further, the display 140 may be used as an input device in addition to an output device by being configured with a touch screen.

According to an embodiment, the display 140 may display a user interface screen image for setting an interactive region, under control of the processor 120. For example, the display 140 may display at least one of an image obtained by photographing a space to be monitored, a generated 3D box, an interface screen image for adjusting a position and a size of the 3D box, an interface screen image for setting content corresponding to the 3D box, and the like.

The user input interface 150 is an interface through which a user inputs data for controlling the electronic device 100. For example, the user input interface 150 may include at least one of a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, a button, a plurality of buttons, a rotatable dial, a voice input and recognition device, and the like, but is not limited thereto.

According to an embodiment, the user input interface 150 may receive at least one of a user input for adjusting a view angle of a displayed image, a user input for selecting at least one point or object included in the image to generate a 3D box, a user input for adjusting a size and a position of the 3D box, and the like, but is not limited thereto.

Figure 3:
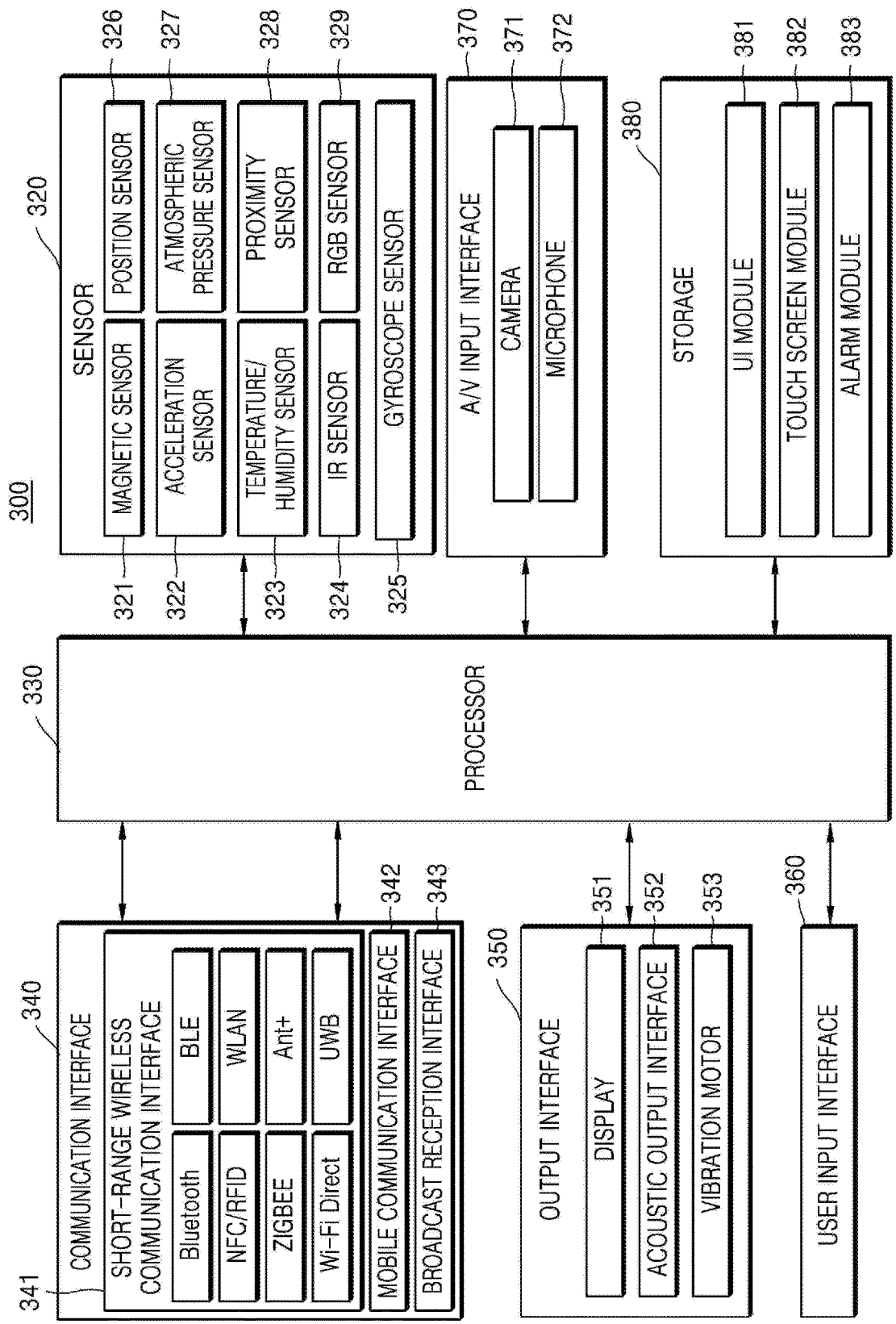
FIG. 3 is a block diagram of an electronic device according to another embodiment.

FIG. 3 is a block diagram of an electronic device 300 according to another embodiment. The electronic device 300 in FIG. 3 may be an embodiment of the electronic device 100 in FIG. 1.

Referring to FIG. 3, the electronic device 300 according to an embodiment may include a processor 330, a sensor 320, a communication interface 340, an output interface 350, a user input interface 360, an audio/video (A/V) input interface 370, and a storage 380.

The communication interface 340, the processor 330, a display 351, the storage 380, and the user input interface 360 in FIG. 3 may correspond to the communication interface 110, the processor 120, the display 130, the memory 140, and the user input interface 150 in FIG. 2, respectively. The same or similar description as made with reference to FIG. 2 may be omitted below.

The communication interface 340 may include at least one component for communicating between an external device (e.g., a server or the like). For example, the communication interface 340 may include at least one of a short-range wireless communication interface 341, a mobile communication interface 342, a broadcast reception interface 343, etc.

The short-range wireless communication interface 341 may include at least one of a Bluetooth communication interface, an NFC interface, a WLAN (Wi-Fi) communication interface, a Zigbee communication interface, an IrDA communication interface, a Wi-Fi Direct (WFD) communication interface, an ultra-wideband (UWB) communication interface, an Ant+ communication interface, and the like, but is not limited thereto.

The mobile communication interface 342 transmits and receives a wireless signal to and from at least one of a base station, an external terminal, a server, etc., in a mobile communication network. Herein, the wireless signal may include a voice call signal, a video call signal, or various types of data according to text/multimedia message transmission and reception.

The broadcast reception interface 343 receives a broadcast signal and/or broadcast related information from the outside through a broadcast channel. Here, the broadcast channel may include a satellite channel and a terrestrial channel. According to implementation examples, the electronic device 300 may not include the broadcast reception interface 343.

The communication interface 340 may receive at least one user image from an external device.

The output interface 350 may output at least one of an audio signal, a video signal, and a vibration signal and may include the display 351, an acoustic output interface 352, a vibration motor 353, and the like.

The acoustic output interface 352 may output audio data received through the communication interface 340 or stored in the storage 380. In addition, the acoustic output interface 352 may output an acoustic signal related to a function (e.g., a call signal reception sound, a message reception sound, or an alarm sound) performed by the electronic device 300. The acoustic output interface 352 may include a speaker, a buzzer, and the like. For example, the acoustic output interface 352 may output an alarm when a recognized user is not an authorized user.

The vibration motor 353 may output a vibration signal. For example, the vibration motor 353 may output a vibration signal corresponding to an output of audio data and/or video data (e.g., a call signal reception sound, a message reception sound, or the like). In addition, the vibration motor 353 may output a vibration signal when a touch is input through a touch screen.

The processor 330 (which may include a plurality of processors) controls a general operation of the electronic device 300. For example, the processor 330 may control the communication interface 340, the output interface 350, the user input interface 360, the sensor 320, the A/V input interface 370, and the like by executing programs stored in the storage 380.

The sensor 320 may detect at least one of biological information of the user, a state of the electronic device 300, or an ambient state of the electronic device 300 and transmit the detected information to the processor 330.

The sensor 320 may include at least one of a magnetic sensor 321, an acceleration sensor 322, a temperature/humidity sensor 323, an IR sensor 324, a gyroscope sensor 325, a position sensor (e.g., global positioning system (GPS)) 326, an atmospheric pressure sensor 327, a proximity sensor 328, an RGB (illuminance) sensor 329, etc., but is not limited thereto. A function of each sensor may be intuitively inferred by those of ordinary skill in the art from a name thereof, and thus a detailed description thereof is omitted herein.

The A/V input interface 370 receives an input of an audio signal and/or a video signal and may include a camera 371, a microphone 372, and the like. The camera 371 may obtain an image frame of a still image, a moving picture, or the like through an image sensor in a video call mode or a capturing mode. An image captured through the image sensor may be processed by the processor 330 or a separate image processor.

An image frame processed by the camera 371 may be stored in the storage 380 and/or transmitted to the outside through the communication interface 340. Two or more cameras 371 may be included according to a configurational aspect of the electronic device 300.

The microphone 372 may receive an external acoustic signal and process the external acoustic signal to electrical voice data. For example, the microphone 372 may receive an acoustic signal from an external device or the user. The microphone 372 may use various noise cancellation algorithms to cancel noise generated during a process of receiving an external acoustic signal.

The storage 380 may store programs and/or instructions for processing and control of the processor 330 and store input/output data (e.g., an application, content, time band information of an external device, an address book, and the like).

The storage 380 may include at least one type of storage medium from among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), programmable ROM (PROM), a magnetic memory, a magnetic disc and an optical disc, etc. In addition, the electronic device 300 may operate, interoperate with, or connect to a web storage or a cloud server having a storage function of the storage 380 over the Internet.

The programs stored in the storage 380 may be classified into a plurality of modules according to functions thereof, e.g., a user interface (UI) module 381, a touch screen module 382, an alarm module 383, and the like.

The UI module 381 may provide a specified UI, a specified graphic UI (GUI), or the like interoperating with the electronic device 300 for each application. The touch screen module 382 may sense a touch gesture of the user on a touch screen and transmit information regarding the touch gesture to the processor 330.

The touch screen module 382 may recognize and analyze a touch code. The touch screen module 382 may be configured by separate hardware including a controller.

The alarm module 383 may generate a signal for informing of the occurrence of an event of the electronic device 300. Examples of the event occurring in the electronic device 300 may include call signal reception, message reception, key signal input, and schedule alarm. The alarm module 383 may output an alarm signal in a video signal form through the display 351, in an audio signal form through the acoustic output interface 352, and/or in a vibration signal form through the vibration motor 353.

The block diagrams of the electronic devices 100 and 300 shown in FIGS. 2 and 3 are only illustrative. Each component in the block diagrams may be integrated, added, or omitted according to actually implemented specifications of the electronic devices 100 and 300. That is, according to circumstances, two or more components may be integrated into one component, one component may be separated into two or more components, and/or one or more components may be omitted. In addition, the functions performed in each block are to describe embodiments, and detailed operations or devices thereof are not limited.

Figure 4:
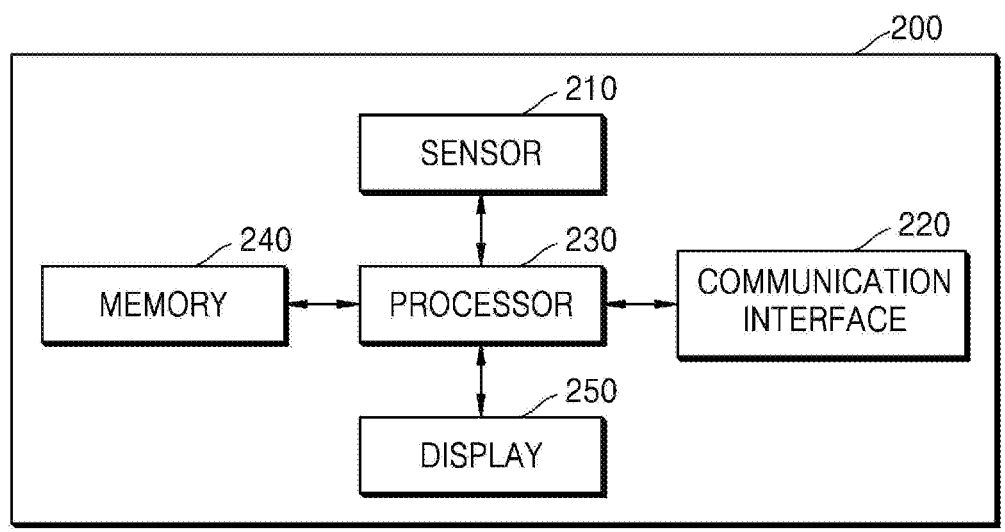
FIG. 4 is a block diagram of a display device according to an embodiment.

FIG. 4 is a block diagram of the display device 200 according to an embodiment.

Referring to FIG. 4, the display device 200 according to an embodiment may include a sensor 210, a communication interface 220, a processor 230, a memory 240, and a display 250.

According to an embodiment, the sensor 210 may sense a state or an ambient state of the display device 200 and transmit the sensed information (or sensed state) to the processor 230.

The sensor 210 may include an image sensor and/or a depth sensor. The display device 200 may obtain an image frame of a still image, a video, or the like through the image sensor. In this case, an image captured by the image sensor may be processed by the processor 230 or a separate image processor.

For example, the image sensor may photograph (or capture an image of) an actual space to be monitored, recognize an object in an interactive region, sense a motion of the object, or the like. Herein, the object may include a human being, a hand of the human being, a finger of the human being, or the like, but is not limited thereto.

In addition, the depth sensor may measure a depth value and the like of an actual object existing in the actual space to be monitored. The depth value may correspond to a distance from the depth sensor to a particular object. In this case, the depth value may increase as the distance from the depth sensor to the particular object becomes farther (although it is understood that one or more other embodiments are not limited thereto).

According to an embodiment, the depth sensor may acquire a depth value of an object in various methods. For example, the depth sensor may measure a depth value by using at least one of a time of flight (TOF) scheme, a stereoscopic vision scheme, or a structured light pattern scheme.

The image sensor and the depth sensor may be configured by separate sensors or as one sensor. In addition, two or more image sensors and/or depth sensors may be included according to a configurational aspect of the display device 200.

According to an embodiment, the sensor 210 may include at least one of a microphone, a human body detection sensor (e.g., an IR sensor, an ultrasonic sensor, or the like), an illuminance sensor, or a temperature/humidity sensor in addition to the image sensor and the depth sensor, but is not limited thereto.

The microphone may receive an external acoustic signal and process the external acoustic signal to electrical voice data. For example, the microphone may receive an acoustic signal from an external device or the user. The microphone may use various noise cancellation algorithms to cancel noise generated during a process of receiving an external acoustic signal.

The functions of the human body detection sensor (e.g., the IR sensor, the ultrasonic sensor, or the like), the illuminance sensor, and the temperature/humidity sensor may be intuitively inferred by those of ordinary skill in the art from names thereof, and thus a detailed description thereof is omitted herein.

According to an embodiment, the communication interface 220 may include at least one component for communicating between the display device 200 and an external device (e.g., an electronic device, a server, or the like).

The communication interface 220 may include one or more components for communication through a LAN, a WAN, a VAN, a mobile radio communication network, a satellite communication network, a radio frequency transmission, etc., taken alone or in combination. In addition, the communication interface 220 may directly transmit and receive data or a signal to and from an external device or an external server in a wireless manner by using a WLAN (e.g., Wi-Fi), Bluetooth, NFC, or the like.

For example, the communication interface 220 may receive information on an interactive region, event information, and content information from the electronic device 100. Alternatively, the communication interface 220 may receive content to be executed by the display device 200 from the electronic device 100 or an external server.

According to an embodiment, the processor 230 may execute one or more programs stored in the memory 240. The processor 230 may include a single core, dual cores, triple cores, quadruple cores, or a multiple number of cores thereof. In addition, the processor 230 may include a plurality of processors. For example, the processor 230 may be implemented by a main processor and a sub-processor operating in a sleep mode.

According to an embodiment, the memory 240 may store various data, programs, or applications for operating and controlling the display device 200.

In addition, a program stored in the memory 240 may include one or more instructions. The program (one or more instructions) or application stored in the memory 240 may be executed by the processor 230.

According to an embodiment, the processor 230 may determine an interactive region based on information on the interactive region (e.g., coordinate value information and the like of a 3D box) and control so as to monitor the interactive region. For example, the processor 230 may monitor whether a preset event occurs in the interactive region, and execute content corresponding to the occurrence of the event when the occurrence of the event is detected.

According to an embodiment, the display 250 generates a driving signal by converting at least one of an image signal, a data signal, an OSD signal, a control signal, or the like processed by the processor 230. The display 250 may be implemented by a PDP, an LCD, an OLED, a flexible display, etc., and may also be implemented by a 3D display. Further, the display 250 may be used as an input device in addition to an output device by being configured with a touch screen. According to an embodiment, the display 250 may display an execution screen image of the content corresponding to the occurrence of the event.

Figure 5:
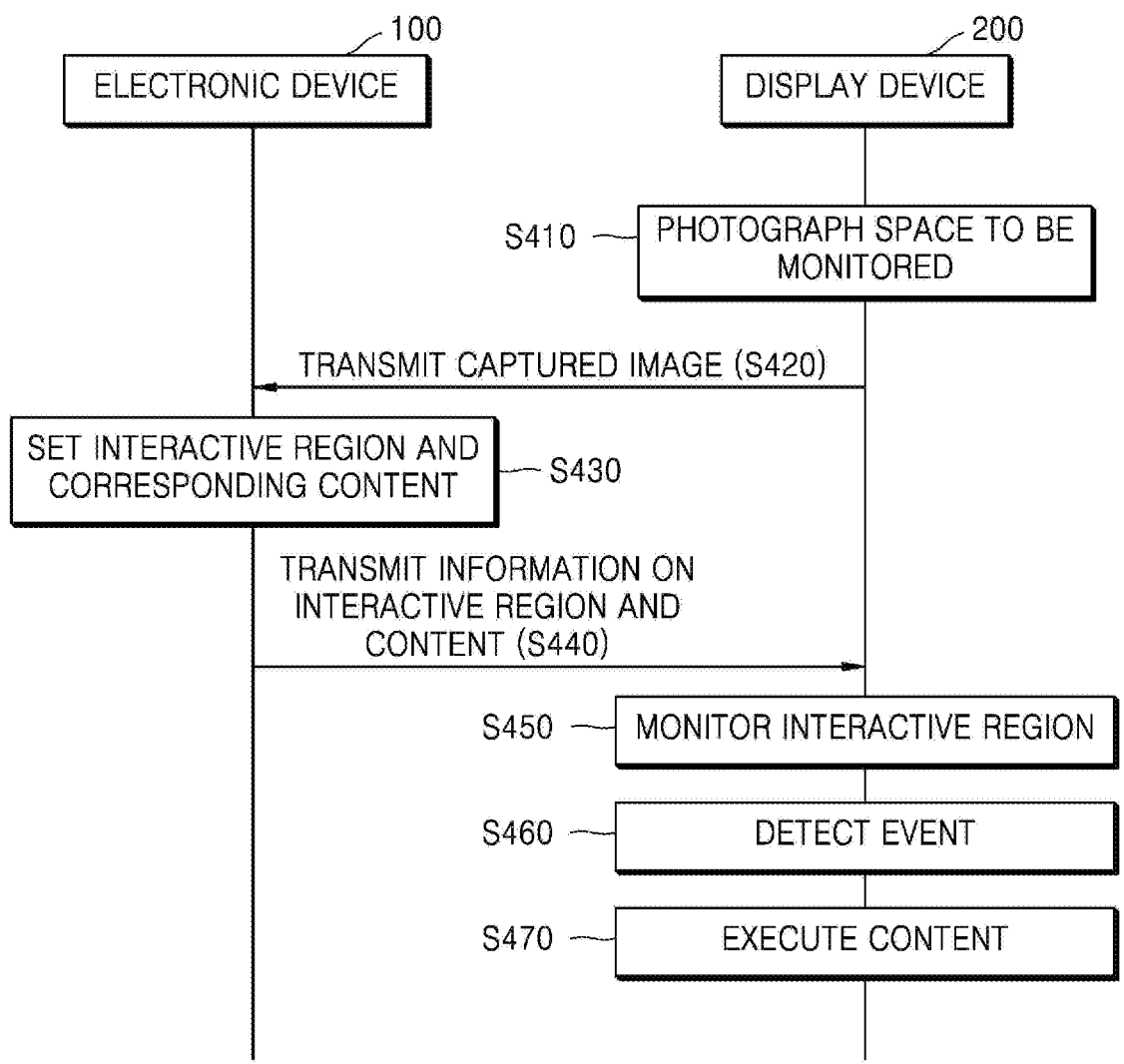
FIG. 5 is a signaling diagram of an operating method of an interactive system, according to an embodiment.

FIG. 5 is a signaling diagram of an operating method of an interactive system, according to an embodiment.

The interactive system according to an embodiment may include the electronic device 100 (or the electronic device 300) and the display device 200.

Referring to FIG. 5, in operation S410, the display device 200 may photograph an actual space to be monitored. For example, the display device 200 may photograph the actual space to be monitored by using an image sensor and/or a depth sensor and acquire depth value information of one or more objects included in the space to be monitored.

In operation S420, the display device 200 may transmit a captured image and/or depth value information of one or more objects included in the image to the electronic device 100. According to another embodiment, the depth value information may be determined by the electronic device 100 via, for example, analysis of the captured image.

The electronic device 100 may display the captured image of the actual space on a display. For example, the electronic device 100 may display an image three-dimensionally indicating the actual space, based on the depth value information of the objects included in the actual space.

In operation S430, the electronic device 100 may set an interactive region based on the displayed image and set content corresponding to the interactive region.

For example, the electronic device 100 may generate a 3D box based on at least one point included in the image. In addition, the electronic device 100 may adjust a size and/or a position of the generated 3D box based on a user input. Furthermore, the electronic device 100 may set, in the photographed actual space, the interactive region corresponding to the 3D box. In addition, the electronic device 100 may set an event and content corresponding to the 3D box, and control so as to execute or output corresponding content when an event occurs in the interactive region corresponding to the 3D box.

Operation 430 of FIG. 5 is described in more detail below with reference to FIGS. 6, 7, 8A, 8B, 9A, 9B, 10, and 11.

In operation S440, the electronic device 100 may transmit at least one of information on the interactive region (e.g., coordinate value information of the 3D box), information on the event, and information on the content to the display device 200.

In operation S450, the display device 200 may monitor the interactive region based on the information on the interactive region, which has been received from the electronic device 100. For example, the display device 200 may determine the interactive region corresponding to the 3D box in the actual space photographed by the display device 200 and monitor whether a preset event occurs in the interactive region.

When the occurrence of the event is detected in operation S460, the display device 200 may execute or output content corresponding to the occurrence of the event in operation S470. The content may include at least one of image content, text content, audio content, video content, game content, and the like, but is not limited thereto. In this case, the content may be received from the electronic device 100 according to an embodiment or an external server, or may be previously stored in the display device 200.

Figure 6:
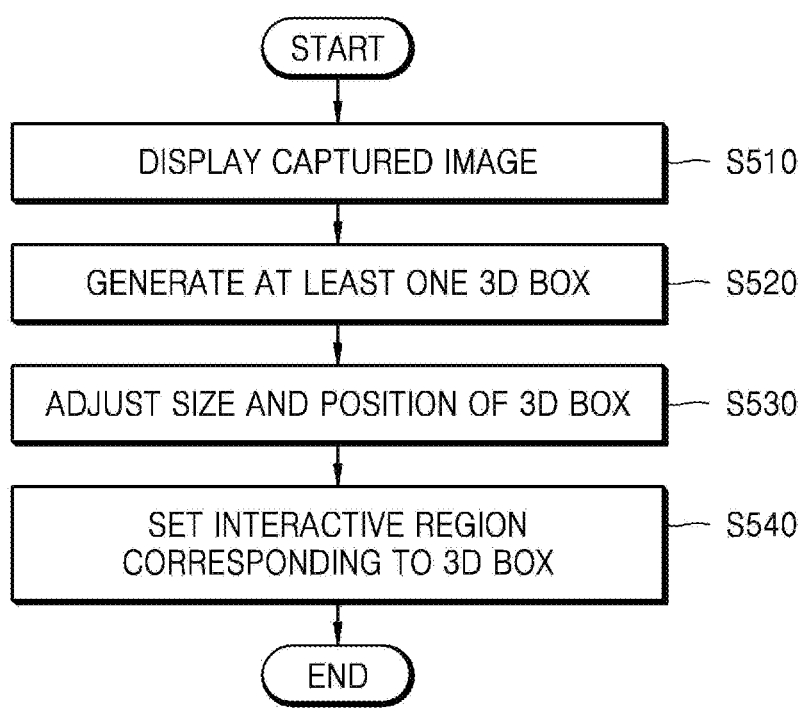
FIG. 6 is a flowchart of an operating method of an electronic device, according to an embodiment.

FIG. 6 is a flowchart of an operating method of the electronic device 100, according to an embodiment.

FIG. 6 is a detailed flowchart of operations for the electronic device 100 to set an interactive region, e.g., a detailed flowchart corresponding to operation S430 of FIG. 5.

Referring to FIG. 6, in operation S510, the electronic device 100 according to an embodiment may display an image obtained by photographing an actual space.

For example, the electronic device 100 may receive the image obtained by photographing the actual space from the display device 200 according to an embodiment or another external device. In this case, the image obtained by photographing the actual space may include depth value information of objects included in the actual space, but is not limited thereto. According to another embodiment, the electronic device 100 may capture the image and/or determine the depth value information.

In operation S520, the electronic device 100 may generate a 3D box based on at least one point included in the image. For example, when a user input for selecting any one point of the image is received, the electronic device 100 may determine whether the selected point is included in an object. When the selected point is not included in an object, the electronic device 100 may generate a 3D box having a preset size. Otherwise, when the selected point is included in an object, the electronic device 100 may generate a 3D box according to a shape and a size of a corresponding object. Alternatively, the electronic device 100 may detect objects included in the image and generate 3D boxes by reconfiguring the detected objects in a 3D form. The electronic device 100 may display the generated 3D box on the image.

In addition, the electronic device 100 may adjust a view angle of the displayed image based on a user input (e.g., a drag input on the image). When the view angle of the displayed image is changed, positions, sizes, directions, and the like of objects in the image may be changed. The electronic device 100 may store images having different view angles and provide the stored images as shortcuts.

In operation S530, the electronic device 100 may adjust a size and/or a position of the generated 3D box.

For example, the electronic device 100 may display a horizontal/vertical size adjustment object on a surface of the generated 3D box, which is viewed from the front based on a view angle of the image. The horizontal/vertical size adjustment object may be to adjust a size in a horizontal direction and/or a vertical direction with respect to the surface viewed from the front. In addition, the electronic device 100 may display a rotation adjustment object by which the 3D box is rotatable.

The electronic device 100 may adjust a size and/or a position of the 3D box based on a user input on the horizontal/vertical size adjustment object and/or the rotation adjustment object.

In operation S540, the electronic device 100 may control so as to set, in the actual space, an interactive region corresponding to the 3D box.

For example, the electronic device 100 may transmit coordinate value information of the 3D box to the display device 200. The display device 200 may determine the interactive region in the actual space based on the received coordinate value information of the 3D box and monitor whether an event occurs in the determined interactive region.

FIGS. 7, 8A, 8B, 9A, and 9B illustrate a method, performed by the electronic device 100, of setting an interactive region, according to one or more embodiments.

Figure 7:
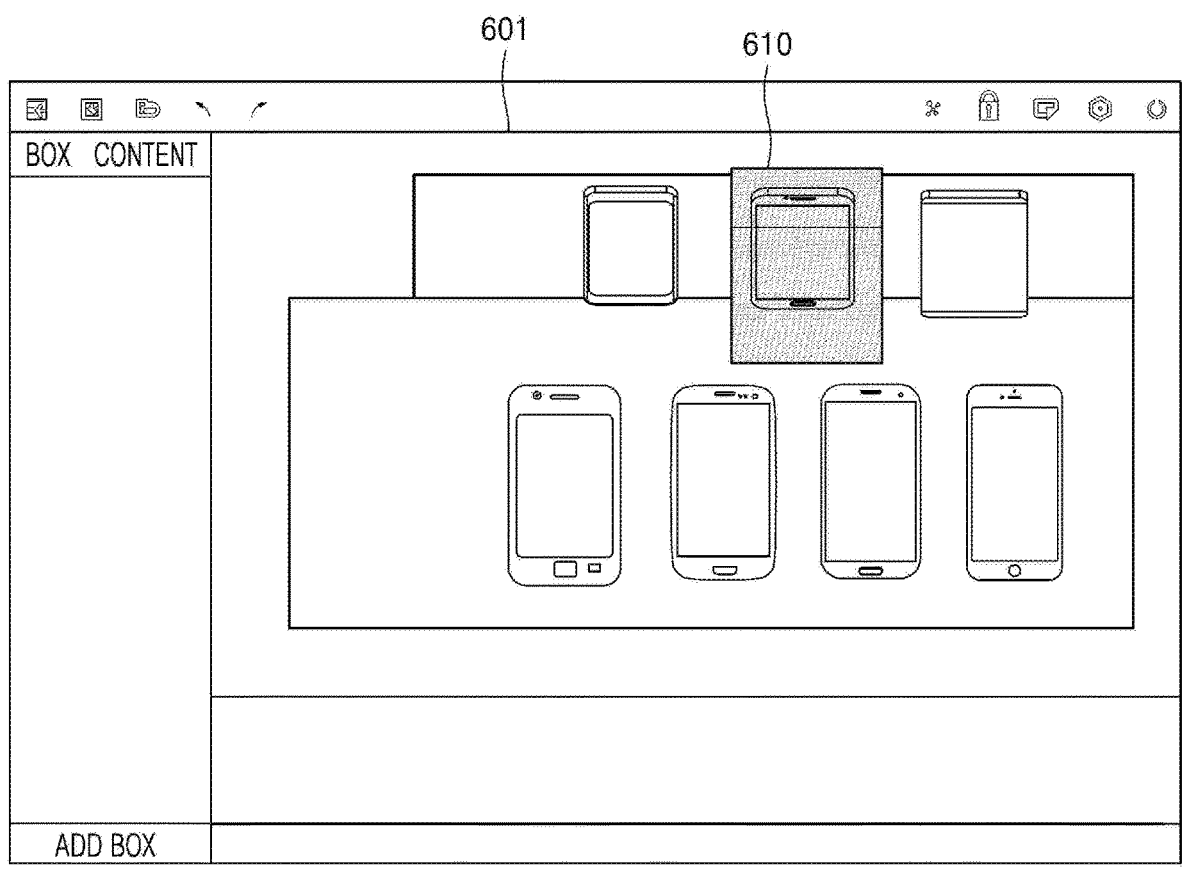
FIG. 7 illustrates a method, performed by an electronic device, of setting an interactive region, according to an embodiment.

Referring to FIG. 7, the electronic device 100 may display, on a display, an image 601 obtained by photographing an actual space to be monitored. The image 601 obtained by photographing the actual space to be monitored may be received from an external device (e.g., the display device 200) or captured by the electronic device 100. In addition, the image 601 obtained by photographing the actual space to be monitored may include at least one object, and the electronic device 100 may display the captured image 601 as a 3D image based on depth value information of objects.

The electronic device 100 may generate a 3D box 610 based on at least one point included in the image 601. For example, when a user input for selecting any one point on an image is received, the electronic device 100 may generate a 3D box having a preset size. Alternatively, when the selected point is included in an object, the electronic device 100 may generate a 3D box according to a shape and a size of a corresponding object (e.g., length, width, and depth dimensions that have a predetermined relationship or correspondence to a shape and/or a size of the corresponding object).

Figure 8A:
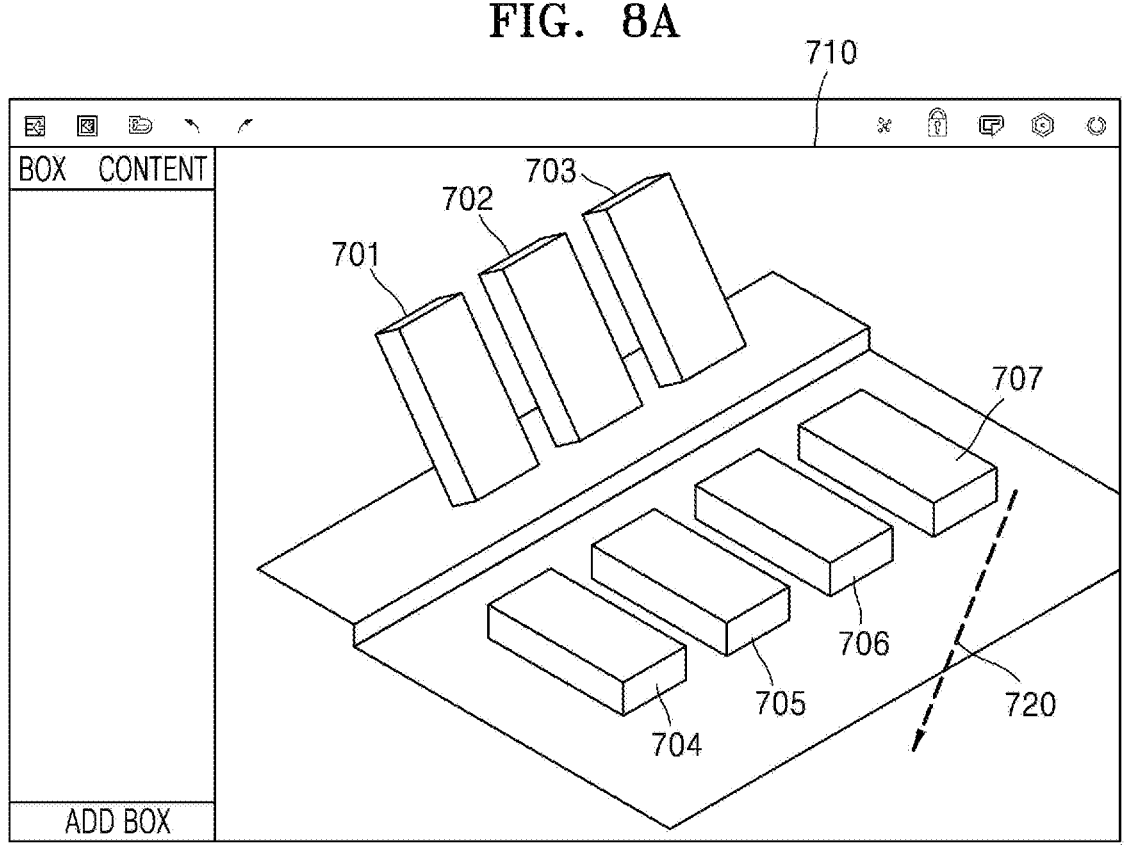
FIG. 8A illustrates a method, performed by an electronic device, of setting an interactive region, according to an embodiment.

Alternatively, as shown in FIG. 8A, the electronic device 100 may detect objects included in an image 710 and generate 3D boxes 701, 702, 703, 704, 705, 706, and 707 by reconfiguring the detected objects in a 3D form. In this case, the electronic device 100 may generate the 3D boxes 701, 702, 703, 704, 705, 706, and 707 by using depth value information of the objects.

Figure 8B:
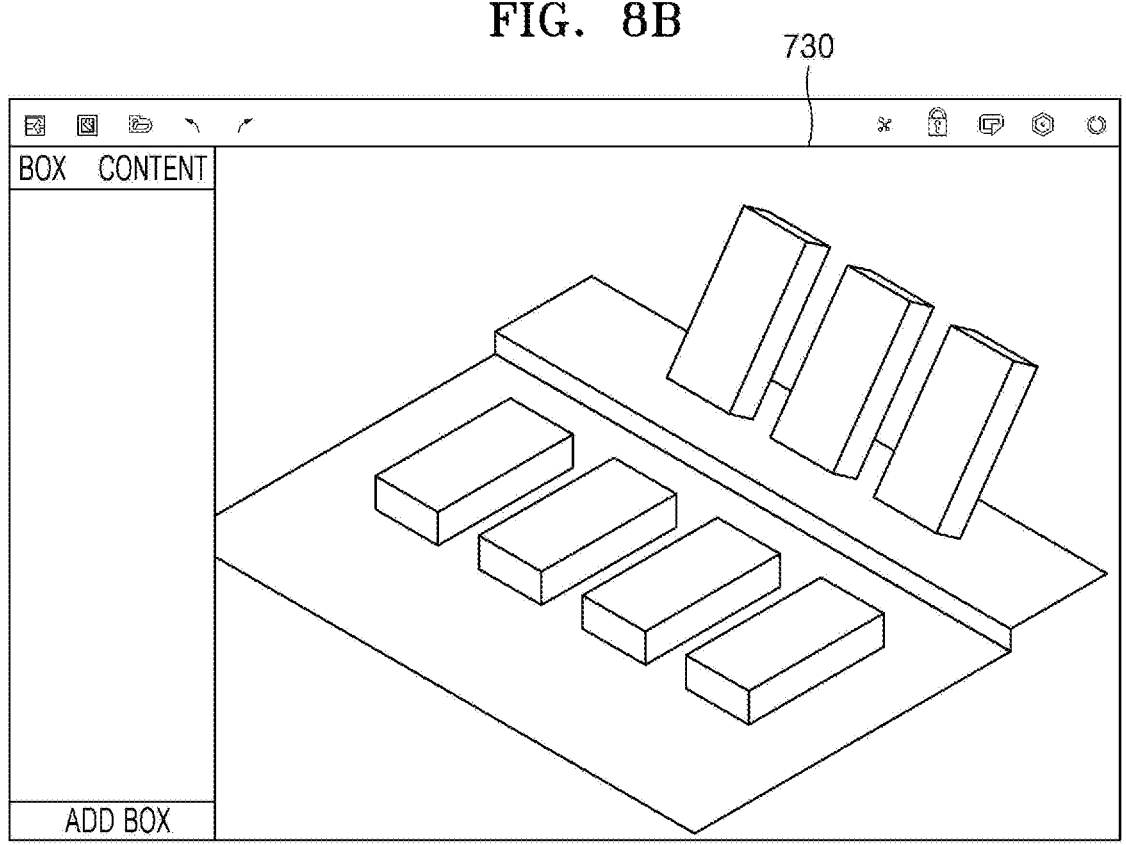
FIG. 8B illustrates a method, performed by an electronic device, of setting an interactive region, according to an embodiment.

The electronic device 100 may adjust a view angle of an image 710 based on a user input. For example, as shown in FIG. 8A, when a drag input 720 of touching one point of an image 710 having a first view angle and moving in a certain direction is received, the electronic device 100 may display an image 730 such that the image 730 has a second view angle as shown in FIG. 8B.

The electronic device 100 may store images having different view angles and provide the stored images as shortcuts. For example, the electronic device 100 may store the image 710 (shown in FIG. 7A) having the first view angle and the image 730 (shown in FIG. 7B) having the second view angle and provide the images 710 and 730 as shortcuts. Alternatively, the electronic device 100 may store an image having a view angle captured by a camera and provide the stored image as a shortcut.

Figure 9A:
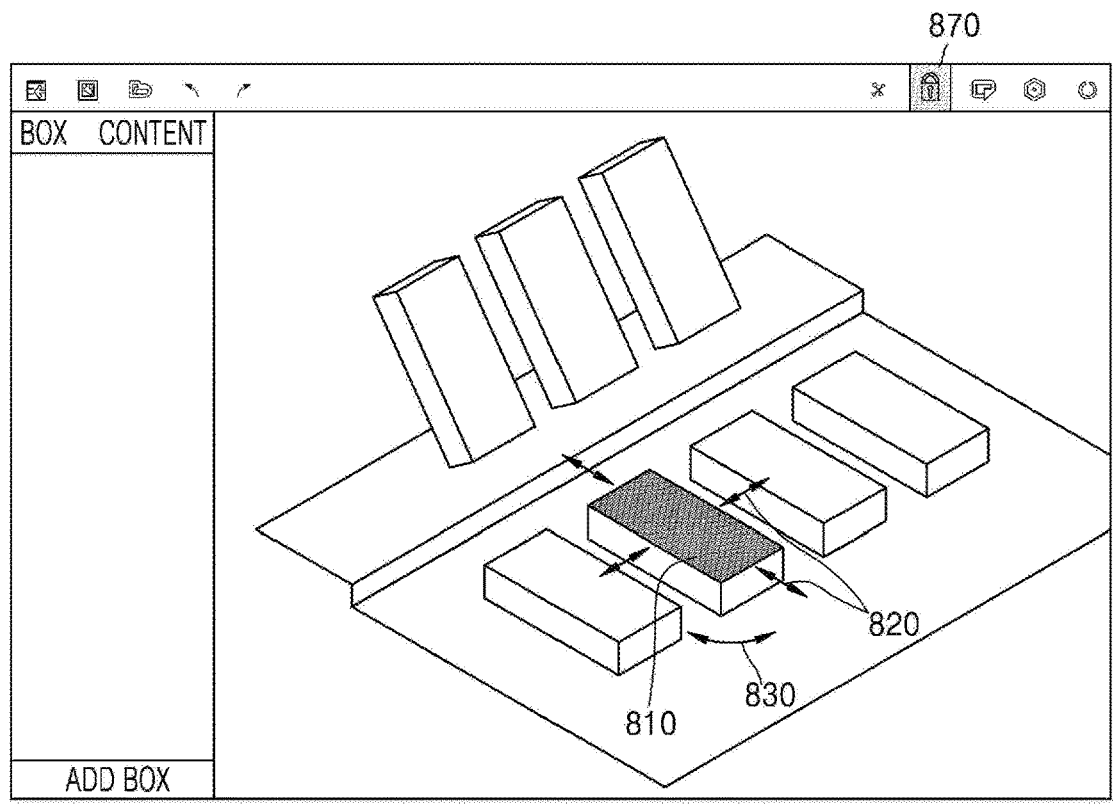
FIG. 9A illustrates a method, performed by an electronic device, of setting an interactive region, according to an embodiment.

The electronic device 100 may adjust a size and/or a position of a generated 3D box. For example, as shown in FIG. 9A, the electronic device 100 may display a horizontal/vertical size adjustment object 820 on a surface 810 viewed from the front based on a view angle of an image (hereinafter, referred to as the first surface 810) in a generated 3D box. For example, when the horizontal/vertical size adjustment object 820 is displayed and then a drag input in the horizontal direction is received, the electronic device 100 may increase or decrease a horizontal-direction size of the first surface 810. In this case, along with the adjustment of the size of the first surface 810, the size of the 3D box including the first surface 810 (e.g., a horizontal or vertical length of the 3D box) may be adjusted. However, the present embodiment is not limited thereto.

In addition, the electronic device 100 may display a rotation adjustment object 830. When the rotation adjustment object 830 is displayed and then a drag input in a clockwise or counterclockwise direction is received, the electronic device 100 may rotate the 3D box in the clockwise or counterclockwise direction based on a straight line perpendicular to the first surface 810 while passing through the center of the first surface 810.

Figure 9B:
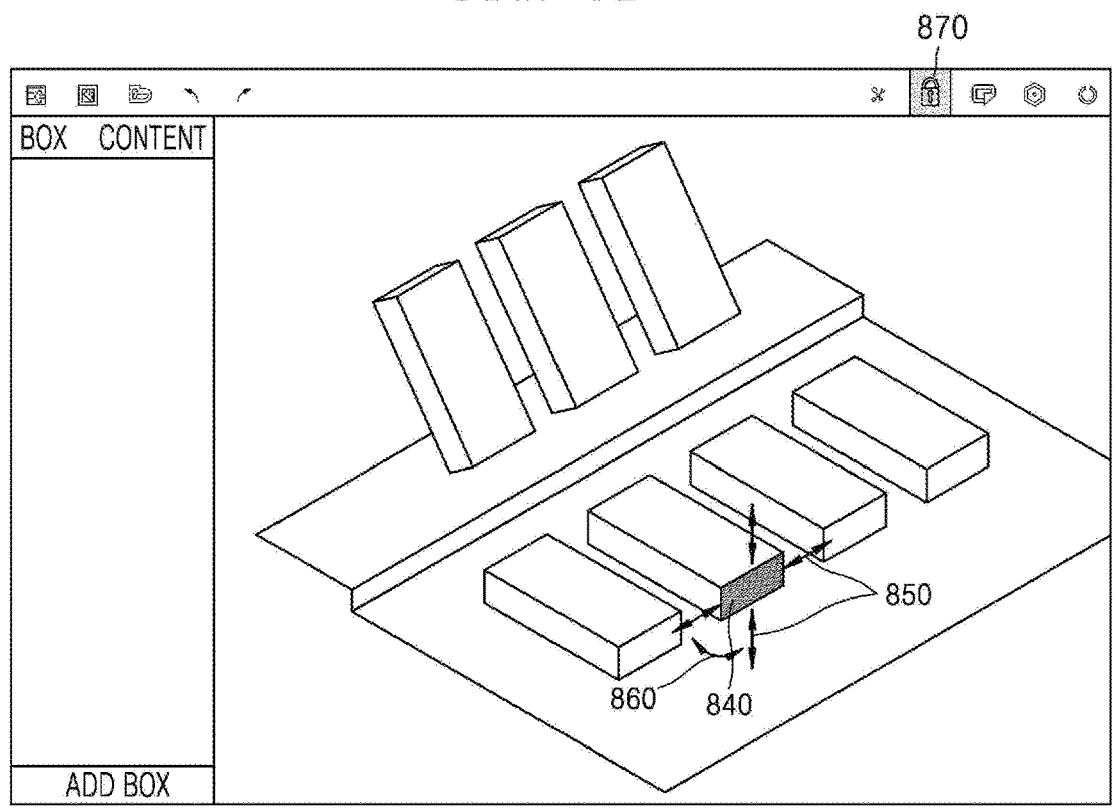
FIG. 9B illustrates a method, performed by an electronic device, of setting an interactive region, according to an embodiment.

In addition, as shown in FIG. 9B, when a view angle of an image is changed, the electronic device 100 may display a horizontal/vertical size adjustment object 850 and a rotation adjustment object 860 on a surface 840 viewed on the front in the image (hereinafter, referred to as the second surface 840) based on the changed view angle. Accordingly, the electronic device 100 may adjust a height of a 3D box upon receiving a drag input in the vertical direction or adjust a horizontal length of the 3D box upon receiving a drag input in the horizontal direction. Alternatively, the electronic device 100 may rotate the 3D box in the clockwise or counterclockwise direction based on a straight line perpendicular to the second surface 840 upon receiving a drag input in the clockwise or counterclockwise direction.

In addition, the electronic device 100 may provide a background image lock function (or view angle lock function) so as not to change a view angle of a displayed image while adjusting a size and a position of a 3D box. For example, the electronic device 100 may display a background image lock icon 870. In this case, when an input for selecting the background image lock icon 870 is received, the electronic device 100 may maintain the view angle of the image without change even when a drag input on the image is received.

The electronic device 100 may set an interactive region corresponding to a 3D box in an actual space based on coordinate value information of the 3D box displayed on an image. Thus, according to an embodiment, the display device 200 may monitor whether a preset event occurs in the set interactive region.

Figure 10:
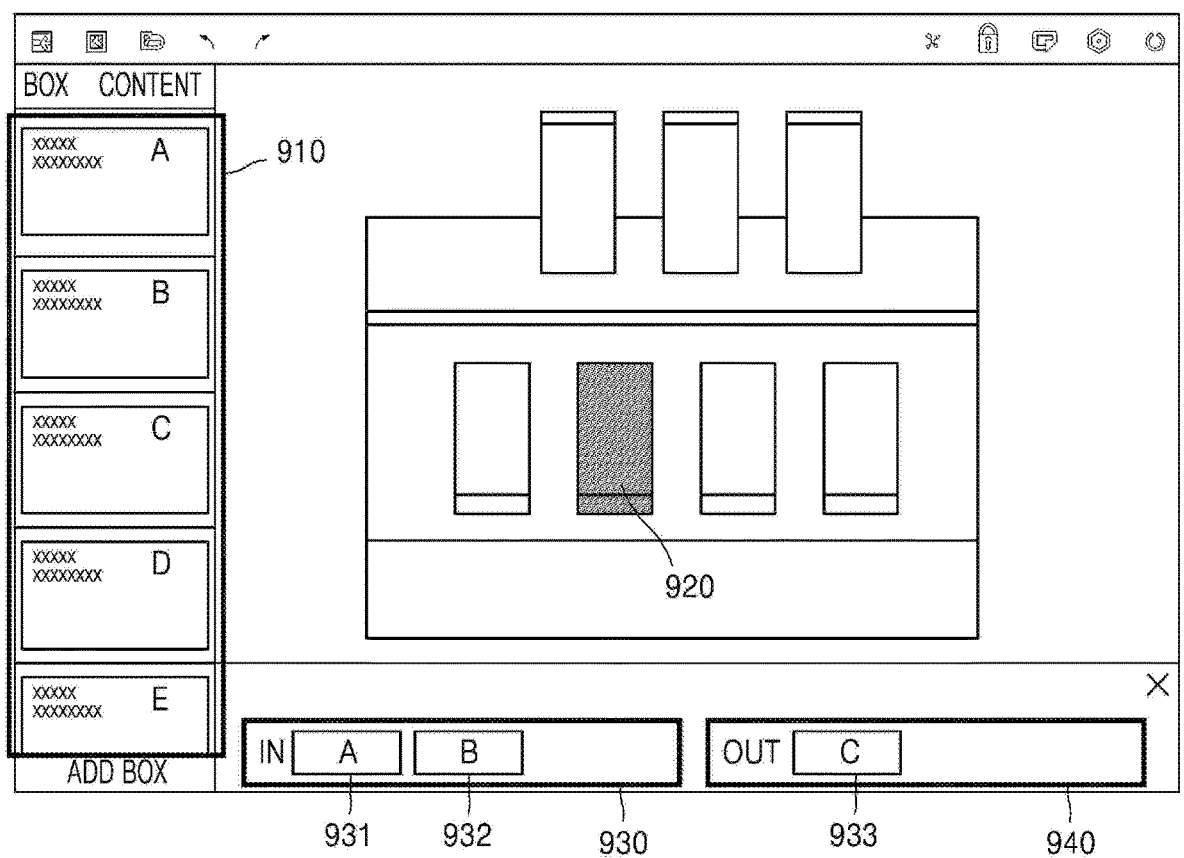
FIG. 10 illustrates a method, performed by an electronic device, of setting content corresponding to an interactive region, according to an embodiment.
Figure 11:
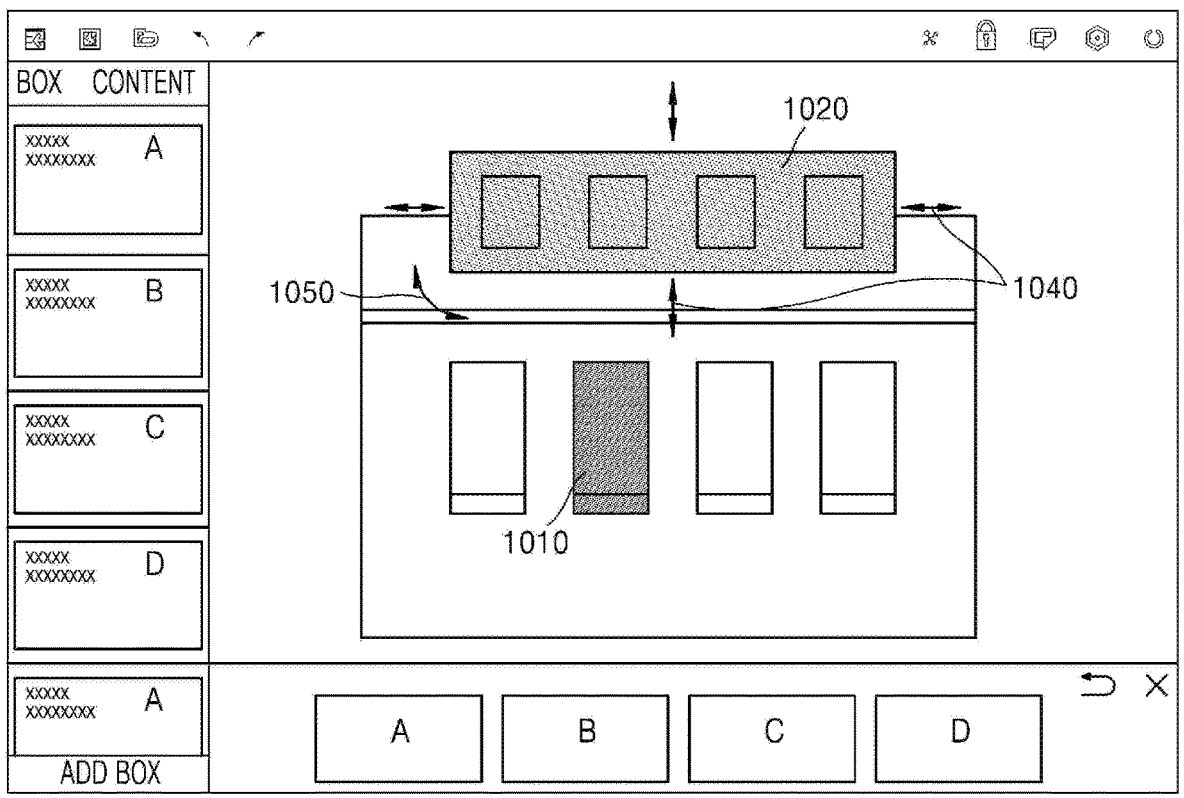
FIG. 11 illustrates a method, performed by an electronic device, of setting content corresponding to an interactive region, according to an embodiment.
Figure 11:
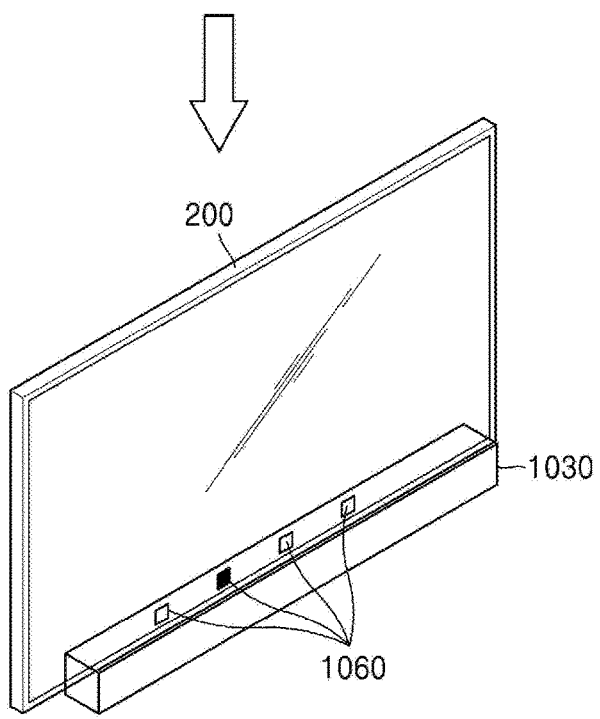

FIGS. 10 and 11 illustrate a method, performed by the electronic device 100, of setting content corresponding to an interactive region, according to one or more embodiments.

Referring to FIG. 10, when a 3D box is set, the electronic device 100 may set content corresponding to the 3D box. For example, as shown in FIG. 10, the electronic device 100 may display a content list 910 including a plurality of pieces of content. The content may include at least one of image content, text content, audio content, video content, game content, and the like, but is not limited thereto.

When an input 920 for selecting any one of a plurality of 3D boxes displayed on a display is received, the electronic device 100 may display a first region 930 corresponding to a first event and a second region 940 corresponding to a second event. In this case, the first event may be an event in which a certain object is detected in an interactive region corresponding to the 3D box. In addition, the second event may be an event in which a certain object is not detected in an interactive region corresponding to a 3D box. However, it is understood that one or more other embodiments are not limited to the first and second events as described above.

The electronic device 100 may receive a selection (e.g., an input of dragging and dropping) of one or more pieces of content included in the content list 910 to the first region 930 or the second region 940. For example, the electronic device 100 may display thumbnail images 931 and 932 (or other identifiers) respectively of first content and second content in the first region 930 upon receiving an input of dragging and dropping the first content and the second content to the first region 930. In addition, the electronic device 100 may display a thumbnail image 933 (or other identifier) of third content in the second region 940 upon receiving an input of dragging and dropping the third content to the second region 940.

Accordingly, the electronic device 100 may control or provide a setting such that the display device 200 executes or outputs the first content and the second content when the occurrence of the first event in an interactive region corresponding to a 3D box is detected (or based on the occurrence of the first event in the interactive region corresponding to the 3D box being detected). In addition, the electronic device 100 may control or provide a setting such that the display device 200 executes or outputs the third content when the occurrence of the second event in an interactive region corresponding to a 3D box is detected (or based on the occurrence of the second event in the interactive region corresponding to the 3D box being detected).

Referring to FIG. 11, when a plurality of pieces of content is set to one event, the electronic device 100 may set a sub-interactive region.

For example, when (or based on) the occurrence of the first event is detected in an interactive region corresponding to a selected 3D box 1010, the display device 200 may be set to execute or output a plurality of (first to fourth) pieces of content A, B, C, and D. In this case, as shown in FIG. 11, the electronic device 100 may generate and display a sub-box 1020 corresponding to a sub-interactive region 1030. The sub-interactive region 1030 may be set to be an area in front of the display device 200 (e.g., directly in front of the display device 200), but is not limited thereto.

A size and/or a position of the sub-box 1020 corresponding to the sub-interactive region 1030 may also be adjusted by using a horizontal/vertical size adjustment object 1040 and/or a rotation adjustment object 1050. The sub-interactive region 1030 may include a plurality of (first to fourth) indicator regions respectively corresponding to the plurality of pieces of content A, B, C, and D. In addition, the electronic device 100 may adjust a size and/or a position of each of the indicator regions.

For example, the sub-box 1020 may include a plurality of indicator boxes respectively corresponding to the plurality of pieces of content A, B, C, and D, and the plurality of indicator regions respectively corresponding to the plurality of indicator boxes may be included in the sub-interactive region 1030. The electronic device 100 and/or the display device 200 may be set so as to execute or output the first content A when an event (e.g., detection of a certain object) occurs (or based on an event occurring) in the first indicator region, execute or output the second content B when an event occurs in the second indicator region, execute or output the third content C when an event occurs in the third indicator region, and execute or output the fourth content D when an event occurs in the fourth indicator region.

In addition, according to an embodiment, the display device 200 may display indicators 1060 indicating positions of the first to fourth indicator regions. In addition, the display device 200 may highlight and display an indicator corresponding to content being currently displayed thereon.

Figure 12:
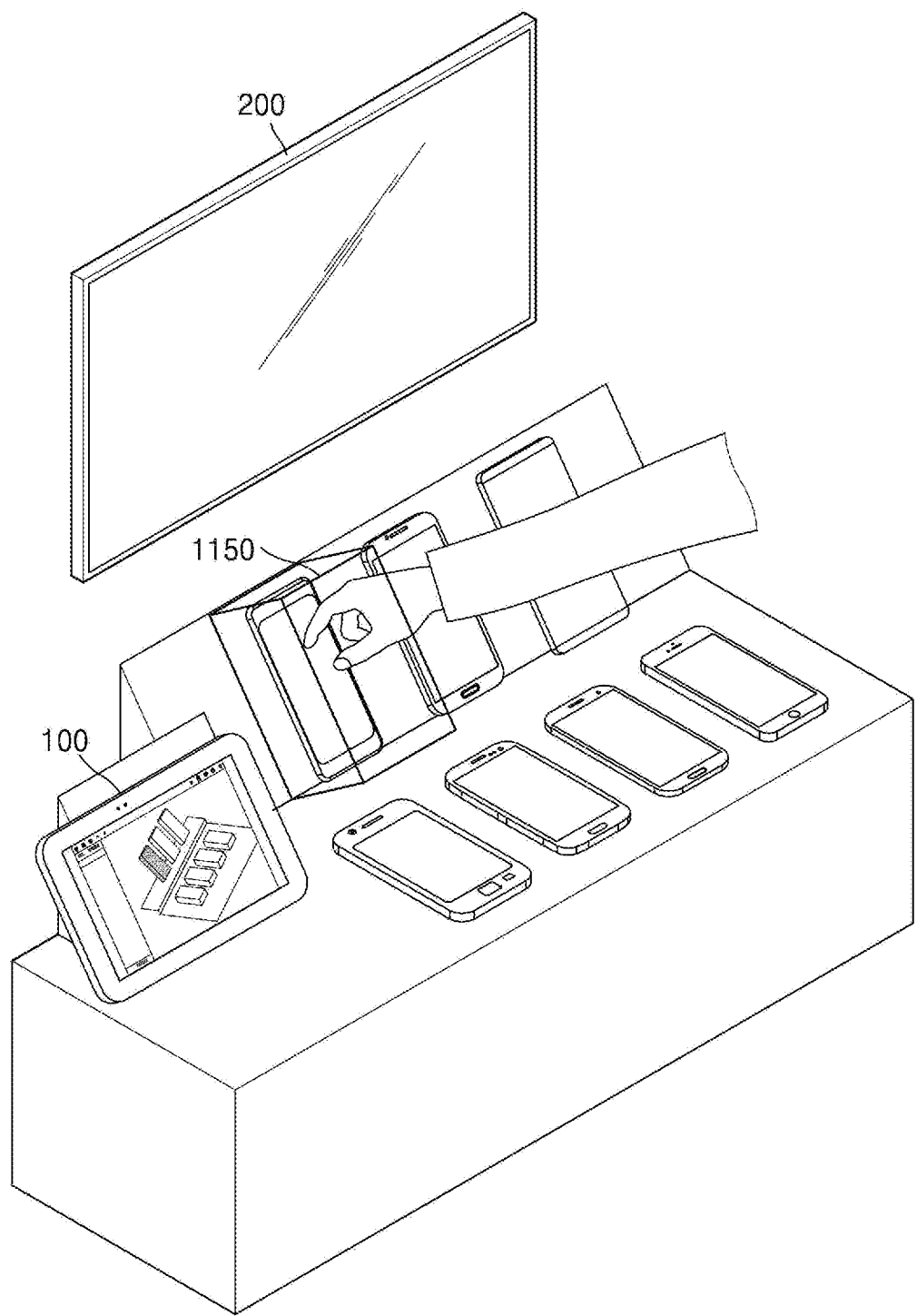
FIG. 12 illustrates an operation of an interactive system including an electronic device and a display device, according to an embodiment.

FIG. 12 illustrates an operation of the interactive system including the electronic device 100 and the display device 200, according to an embodiment.

The electronic device 100 may transmit coordinate value information of a generated 3D box, information on an event corresponding to the 3D box, and information on content corresponding to the event to the display device 200.

Accordingly, the display device 200 may determine an interactive region 1150 corresponding to the 3D box in an actual space based on the coordinate value information of the 3D box and monitor whether the event (e.g., detection of a certain object) occurs in the interactive region 1150. The display device 200 may execute preset content when the certain object is detected in the interactive region 1150.

In addition, the display device 200 may transmit information on a position at which the object is detected (e.g., coordinate value information) to the electronic device 100. In this case, as shown in FIG. 12, the electronic device 100 may display the information on the position at which the object is detected, with a dot, a surface, a box, etc.

Figure 13:
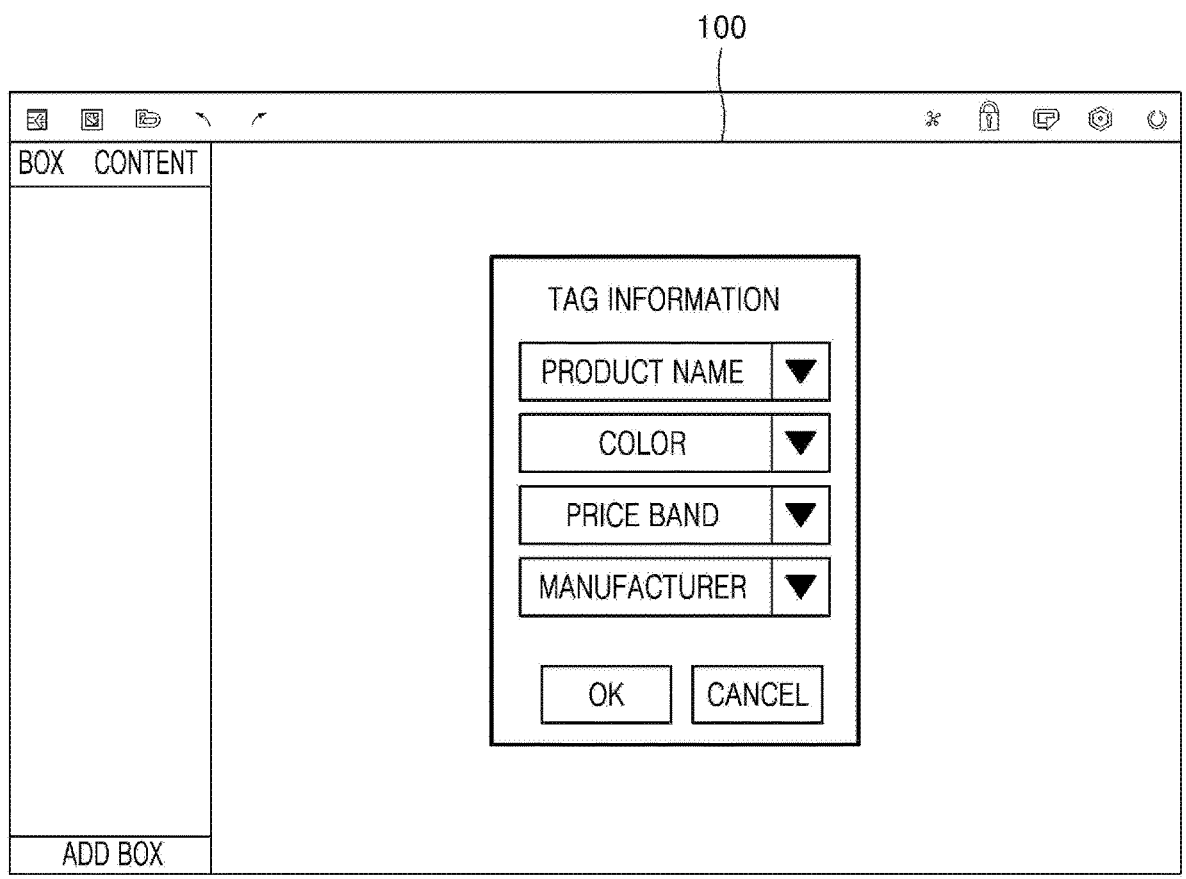
FIG. 13 illustrates a method of setting tag information in an interactive region, according to an embodiment.

FIG. 13 illustrates a method of setting tag information in an interactive region, according to an embodiment.

Referring to FIG. 13, the electronic device 100 may set or determine tag information to a 3D box. For example, at least one of a product name (e.g., model name and/or number), a manufacturer, a manufacturing year, a release year, a color, a price, etc., of a product located or to be located in an interactive region corresponding to the 3D box are set as the tag information, but are not limited thereto.

The electronic device 100 or another device (e.g., an external server) may collect a plurality of pieces of tag information corresponding to interactive regions when the occurrence of events in the interactive regions are detected (or based on the occurrence of events in the interactive regions being detected). For example, first tag information (e.g., GALAXY S9, black, 800 US dollars) may be set or determined for a first interactive region, second tag information (e.g., GALAXY NOTE 8, blue, 700 US dollars) may be set or determined for a second interactive region, and third tag information (e.g., GALAXY NOTE 8, black, 700 US dollars) may be set or determined for a third interactive region. When (or based on) an event in which an object (e.g., a certain object) is detected in the first interactive region occurs five times, an event in which an object (e.g., a certain object) is detected in the second interactive region occurs two times, and an event in which an object (e.g., a certain object) is detected in the third interactive region occurs one time, data may be collected as five times for GALAXY S9 and three times for GALAXY NOTE 8 in terms of model name, data may be collected as six times for black and two times for blue in terms of color, and data may be collected as five times for 800 US dollars and three times for 700 US dollars in terms of price.

Accordingly, the electronic device 100 or the other device (e.g., the external server) may analyze data of an interaction between the occurrence of events and sales by using the number of times that tag information is collected.

Figure 14A:
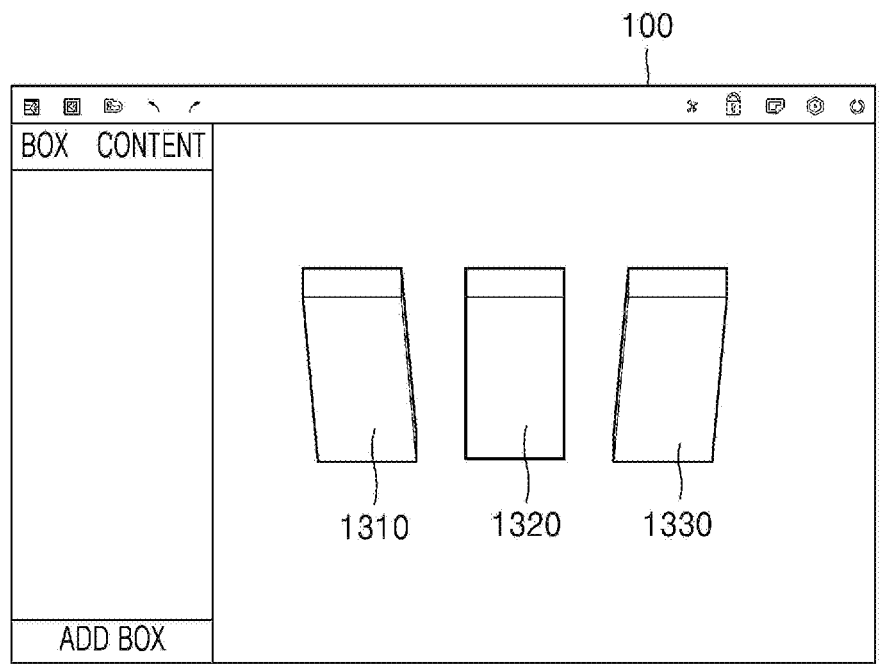
FIG. 14A illustrates a method, performed by an electronic device, of storing a set interactive region, according to an embodiment.
Figure 14B:
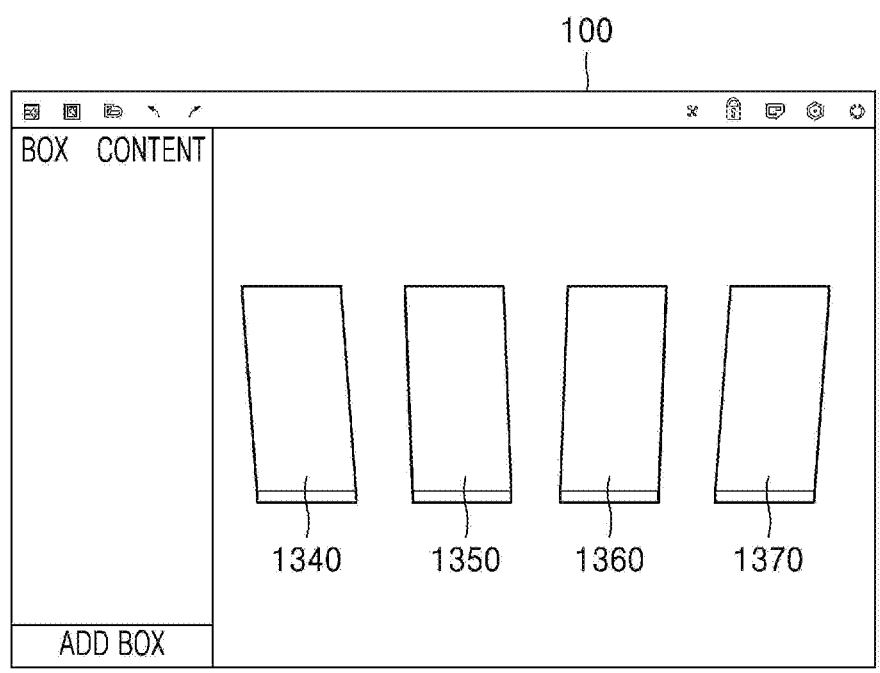
FIG. 14B illustrates a method, performed by an electronic device, of storing a set interactive region, according to an embodiment.

FIGS. 14A and 14B illustrate a method, performed by the electronic device 100, of storing a set interactive region, according to an embodiment.

The electronic device 100 may generate a plurality of 3D boxes and set a plurality of interactive regions respectively corresponding to the plurality of 3D boxes.

For example, as shown in FIG. 14A, the electronic device 100 may generate three 3D boxes 1310, 1320, and 1330 and set or control to set, in an actual space, first to third interactive regions respectively corresponding to the three 3D boxes 1310, 1320, and 1330. In this case, the electronic device 100 may store a layout including the three 3D boxes 1310, 1320, and 1330 as a first file. For example, coordinate value information and tag information of the three 3D boxes 1310, 1320, and 1330 may be stored.

In addition, as shown in FIG. 14B, the electronic device 100 may generate four 3D boxes 1340, 1350, 1360, and 1370 and set or control to set, in the actual space, fourth to seventh interactive regions respectively corresponding to the four 3D boxes 1340, 1350, 1360, and 1370. In this case, the electronic device 100 may store a layout including the four 3D boxes 1340, 1350, 1360, and 1370 as a second file. For example, coordinate value information and tag information of the four 3D boxes 1340, 1350, 1360, and 1370 may be stored.

Accordingly, the electronic device 100 may change and set content corresponding to 3D boxes (or interactive regions) by using the stored first or second file, thereby easily constituting an interactive system.

Figure 15:
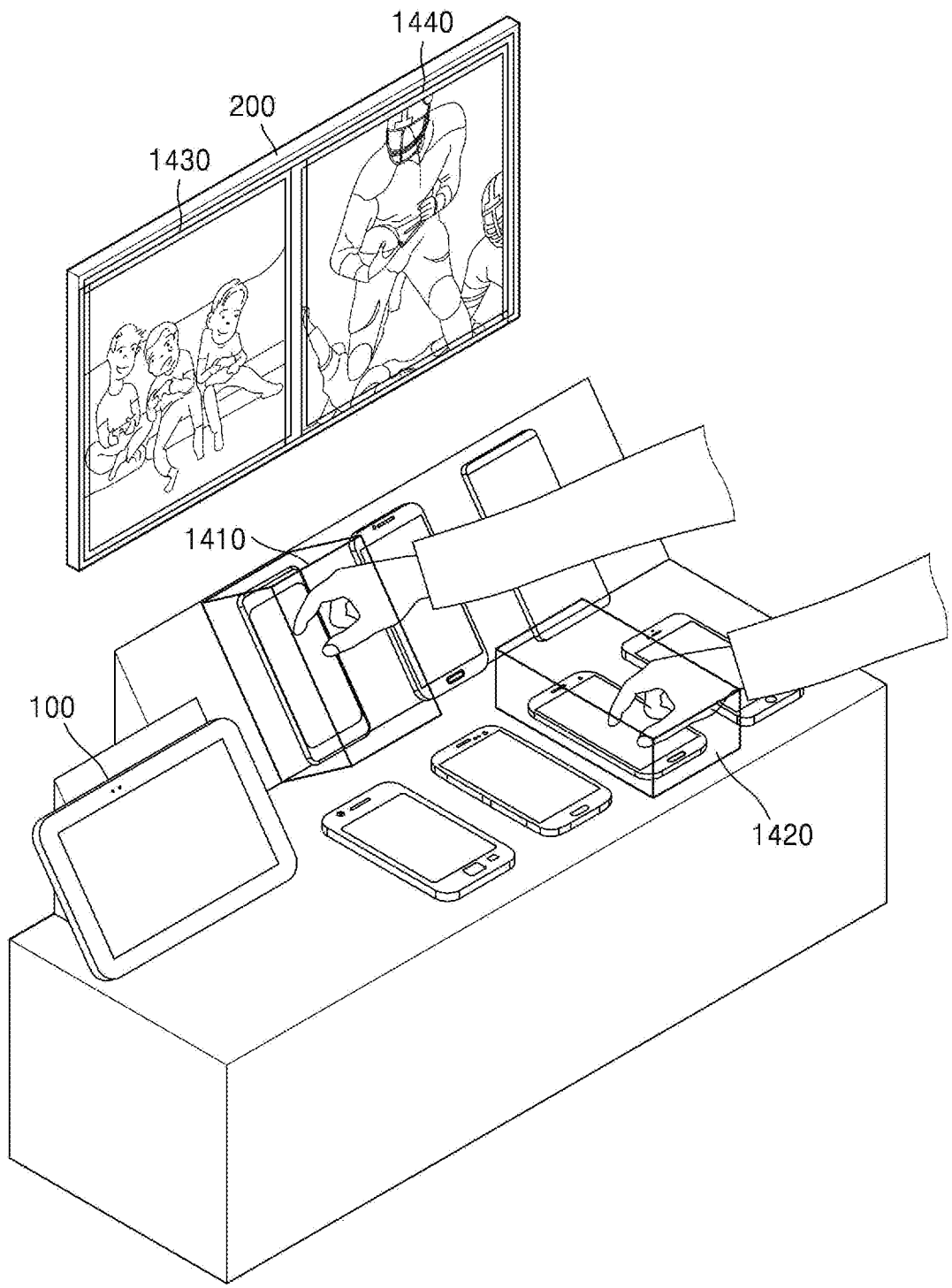
FIG. 15 illustrates an operating method of an interactive system, according to an embodiment.

FIG. 15 illustrates an operating method of an interactive system, according to an embodiment.

Referring to FIG. 15, the electronic device 100 may be set and/or control so as to simultaneously execute a plurality of pieces of content respectively corresponding to a plurality of events when the plurality of events occur at the same time. For example, when events simultaneously occur in a first interactive region 1410 and a second interactive region 1420 set in (or determined for) an actual space by the electronic device 100 according to an embodiment, it may be set (e.g., according to a user input or by default) such that both first content corresponding to the first interactive region 1410 and second content corresponding to the second interactive region 1420 are executed or output. Accordingly, when events simultaneously occur (or are detected at a same time) in the first interactive region 1410 and the second interactive region 1420, the display device 200 may divide a screen into two regions (a first region 1430 and a second region 1440) (or display a divided screen) and display the first content on the first region 1430 and the second content on the second region 1440.

In addition, when an event occurs in the second interactive region 1420 within a preset time while the display device 200 is displaying the first content on the full screen in response to the occurrence of the first event in the first interactive region 1410, the display device 200 may divide the screen into two regions (the first region 1430 and the second region 1440). In this case, the preset time may be determined based on a user input or an execution time of the first content. In addition, the display device 200 may display the first content on the first region 1430 and the second content on the second region 1440, but is not limited thereto in one or more other embodiments.

Figure 16:
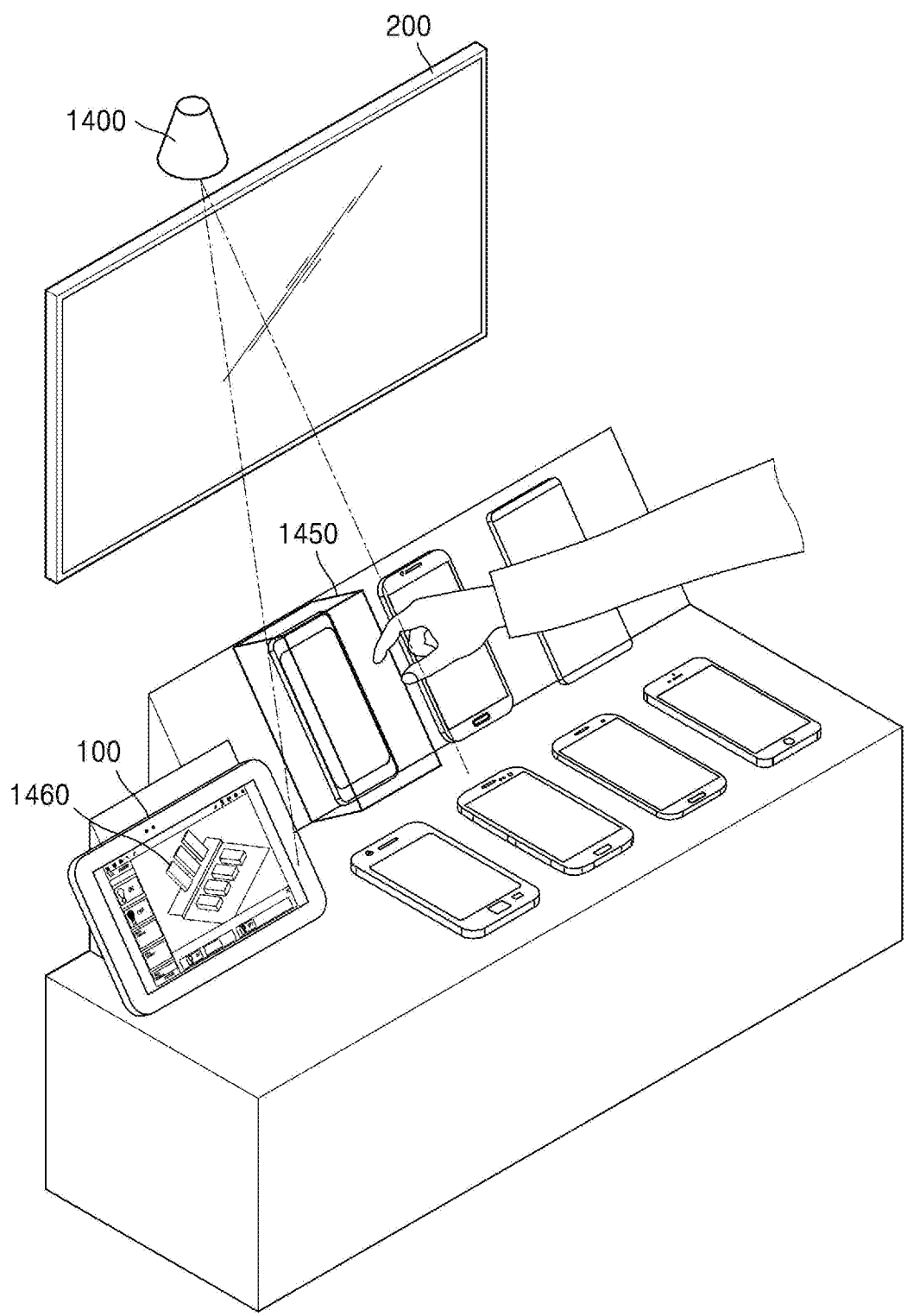
FIG. 16 illustrates an operating method of an interactive system, according to an embodiment.

FIG. 16 illustrates an operating method of an interactive system, according to an embodiment.

Referring to FIG. 16, the interactive system according to an embodiment may include the electronic device 100, the display device 200, and an Internet-of-things (IoT) device 1400. According to an embodiment, the electronic device 100 may be set or control to allow the IoT device 1400 to operate when the occurrence of an event in a set interactive region is detected. The IoT device 1400 may, for example, be a lighting device, but is not limited thereto.

For example, as shown in FIG. 16, the electronic device 100 may be set or control to turn on the lighting device 1400 when (or based on) the occurrence of a first event (e.g., an event that a certain object is detected) in an interactive region 1450 corresponding to a 3D box 1460 is detected. In addition, the electronic device 100 may be set or control to turn off the lighting device 1400 when (or based on) the occurrence of a second event (e.g., an event that the detected certain object is not detected) in the interactive region 1450 corresponding to the 3D box 1460 is detected.

In this case, the display device 200 may monitor the interactive region 1450, and transmit information indicating the occurrence of the first event or an on command to the lighting device 1400 when the occurrence of the first event in the interactive region 1450 is detected. In addition, the display device 200 may transmit information indicating the occurrence of the second event or an off command to the lighting device 1400 when the occurrence of the second event in the interactive region 1450 is detected.

The lighting device 1400 may receive information indicating at least one of the occurrence of an event, the on command, the off command, or the like from the display device 200 and turn the lighting device 1400 on or off according to the received information (e.g., the occurrence of the event).

Figure 17:
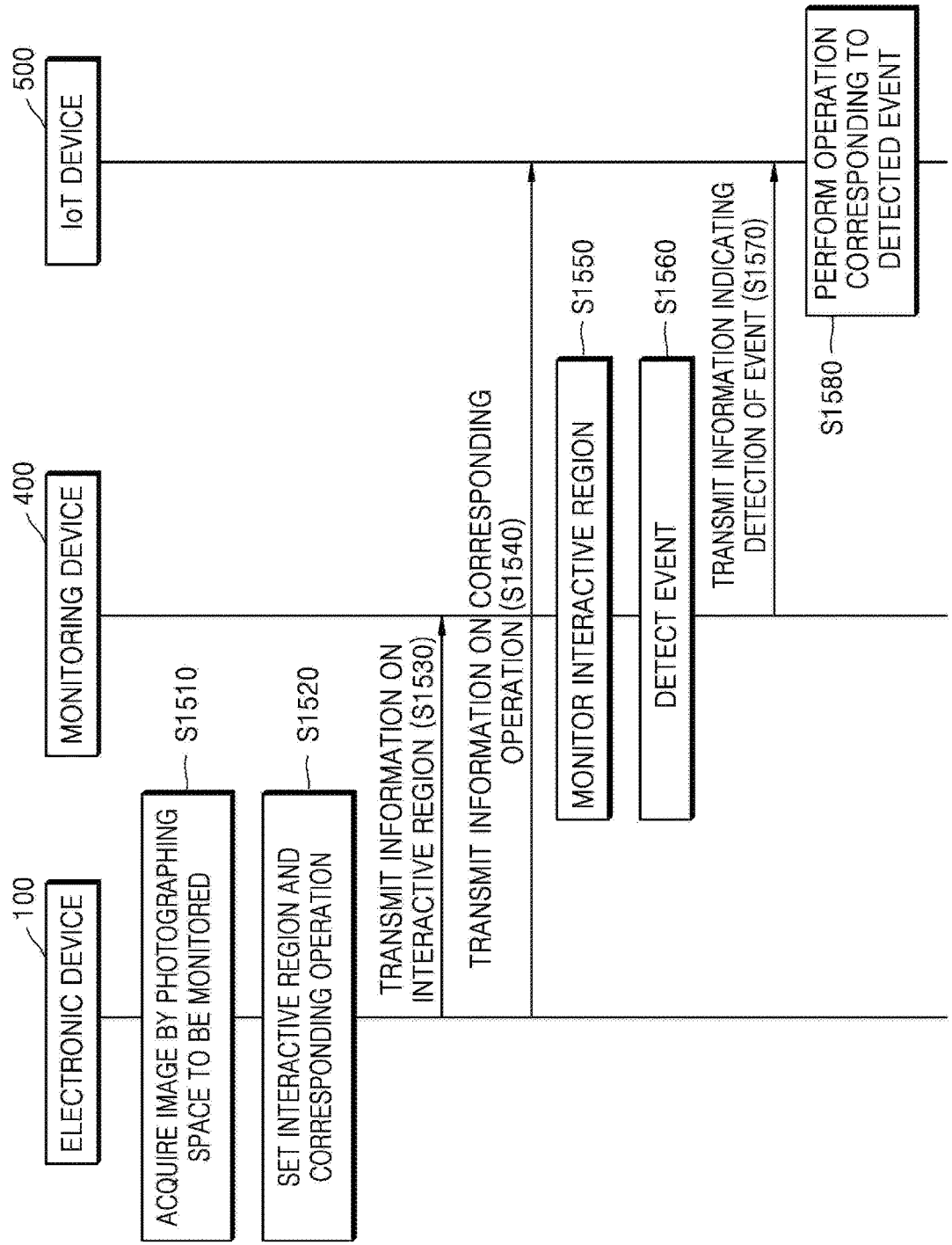
FIG. 17 is a signaling diagram of an operating method of an interactive system, according to an embodiment.

FIG. 17 is a signaling diagram of an operating method of an interactive system, according to an embodiment.

Referring to FIG. 17, the interactive system according to an embodiment may include the electronic device 100 or 300, a monitoring device 400, and an IoT device 500.

In operation S1510, the electronic device 100 according to an embodiment may acquire (e.g., capture) an image by photographing an actual space to be monitored. The image obtained by photographing the actual space to be monitored may be captured by the electronic device 100, the monitoring device 400, an external device, an accessory device, etc.

The electronic device 100 may display, on a display (e.g., an internal display or an external display), the captured image of the actual space. For example, the electronic device 100 may display an image three-dimensionally indicating the actual space, based on depth value information of objects included in the actual space.

In operation S1520, the electronic device 100 may set an interactive region based on the displayed image and set an operation of the IoT device 500, which corresponds to the interactive region. A method of setting an interactive region by the electronic device 100 has been described in detail with reference to operation S430 of FIG. 5 and FIGS. 6, 7, 8A, 8B, 9A and 9B, and thus a detailed description thereof is omitted below.

In addition, the electronic device 100 may be set or control to allow the IoT device 500 to perform a preset operation when (or based on) an event occurs in the interactive region.

The electronic device 100 may transmit information on the interactive region (e.g., coordinate value information of a 3D box and the like) and information on the event to the monitoring device 400 in operation S1530 and transmit information on the set operation of the IoT device 500 to the IoT device 500 in operation S1540. Alternatively or additionally, the electronic device 100 may transmit the information on the set operation of the IoT device 500 to the monitoring device 400.

In operation S1550, the monitoring device 400 may monitor the interactive region based on the information on the interactive region, which has been received from the electronic device 100. For example, the monitoring device 400 may determine an interactive region corresponding to a 3D box in an actual space photographed or captured by the monitoring device 400 (or another device) and monitor whether a preset event occurs in the interactive region.

When (or based on) the occurrence of an event is detected in operation S1560, the monitoring device 400 may transmit information indicating the occurrence of the event to the IoT device 500 in operation S1570.

In operation S1580, the IoT device 500 may perform an operation corresponding to the occurred (e.g., detected) event.

Figure 18:
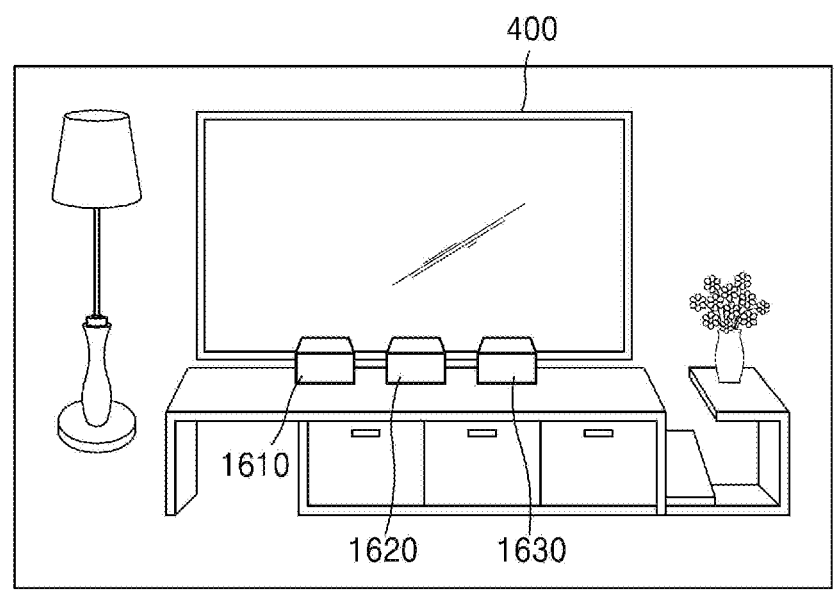
FIG. 18 illustrates an operating method of an interactive system, according to an embodiment.
Figure 18:
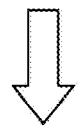
Figure 18:
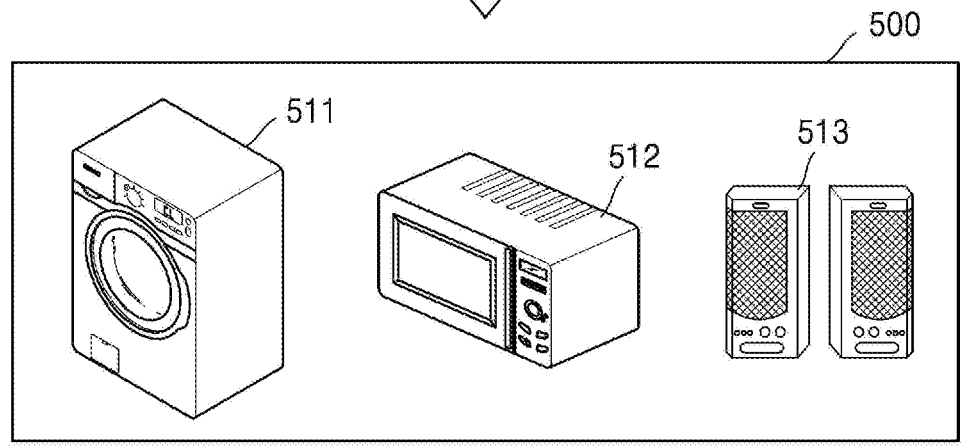

FIG. 18 illustrates an operating method of an interactive system, according to an embodiment.

Referring to FIG. 18, the interactive system according to an embodiment may include the electronic device 100, the monitoring device 400, and the IoT device 500.

According to an embodiment, the electronic device 100 may control so as to set a first interactive region 1610, a second interactive region 1620, and a third interactive region 1630 in an actual space. The electronic device 100 may acquire an image by photographing the actual space to be monitored (or from another device or accessory) and set an interactive region based on the acquired image. A method of setting an interactive region by the electronic device 100 has been described in detail with reference to FIGS. 6, 7, 8A, 8B, 9A, and 9B, and thus a detailed description thereof is omitted below.

The monitoring device 400 may monitor whether a preset event occurs in each of the first to third interactive regions 1610, 1620, and 1630.

For example, the electronic device 100 may set the event corresponding to each of the first to third interactive regions 1610, 1620, and 1630 as an event in which a certain object is detected. In addition, the electronic device 100 may set an on/off operation of a washing machine 511 as an operation corresponding to the first interactive region 1610, an on/off operation of a microwave oven 512 as an operation corresponding to the second interactive region 1620, and an on/off operation or a volume adjustment operation of a speaker 513 as an operation corresponding to the third interactive region 1630, but it is understood that the operations corresponding to the first to third interactive regions 1610, 1620, and 1630 are not limited thereto.

The monitoring device 400 may transmit information indicating the occurrence of an event to the washing machine 511 based on the event (e.g., first event) being detected in the first interactive region 1610, to the microwave oven 512 based on the event (e.g., first event or second event) being detected in the second interactive region 1620, and to the speaker 513 based on the event (e.g., first event, second event, or third event) being detected in the third interactive region 1630. Alternatively, the monitoring device 400 may transmit a control command to the washing machine 511, the microwave oven 512, and the speaker 513 such that each of the washing machine 511, the microwave oven 512, and the speaker 513 performs a preset operation corresponding to the occurrence of the event. Each of the washing machine 511, the microwave oven 512, and the speaker 513 may perform an on/off operation or a volume adjustment operation in response to the occurred event.

Accordingly, the first to third interactive regions 1610, 1620, and 1630 may operate as virtual switches for IoT devices (the washing machine 511, the microwave oven 512, and the speaker 513), respectively.

Figure 19:
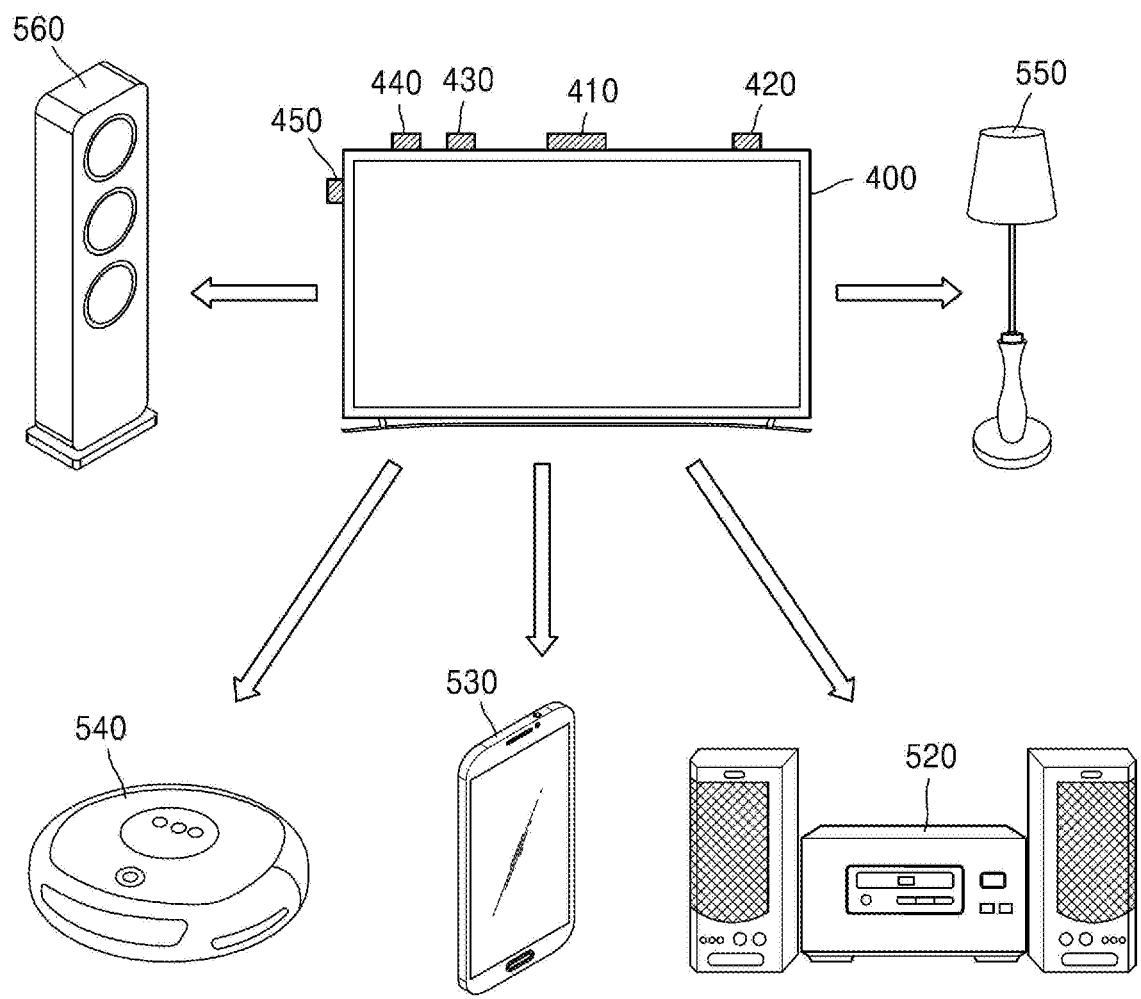
FIG. 19 illustrates an operating method of an interactive system, according to an embodiment.

FIG. 19 illustrates an operating method of an interactive system, according to an embodiment.

Referring to FIG. 19, the interactive system may include the monitoring device 400 and at least one of IoT devices 520, 530, 540, 550, or 560.

According to an embodiment, the monitoring device 400 may be a display device, but is not limited thereto. The monitoring device 400 may include a camera 410, a microphone 420, a human body detection sensor 430, an illuminance sensor 440, a temperature sensor 450, and the like. The camera 410, the microphone 420, the human body detection sensor 430, the illuminance sensor 440, the temperature sensor 450, and the like may be modules embedded in the monitoring device 400 or may be configured as separate modules and provided to the monitoring device 400.

The monitoring device 400 may monitor whether a preset event occurs, and transmit information indicating the occurrence of the event to an IoT device corresponding to the occurred (e.g., detected) event when the event occurs (e.g., based on the event being detected).

For example, the monitoring device 400 may detect a human being in a set interactive region by using the camera 410 to recognize the detected person or to monitor the number of people. The monitoring device 400 may transmit information on the recognized person or information on the number of detected people to a TV. The TV may be turned on, change a current channel to a channel corresponding to the recognized person, or change the current channel to a channel corresponding to the number of detected people based on the received information.

The monitoring device 400 may detect a baby crying sound by using the microphone 420. The monitoring device 400 may transmit information indicating the occurrence of an event (the detection of the baby crying sound) to audio equipment 520 or a cellular phone 530. Based on the received information, the audio equipment 520 may play a lullaby, and/or the cellular phone 530 may send a text message or make a call to a preset external device.

The monitoring device 400 may recognize a user by analyzing a voice input through the microphone 420. When a particular user is recognized, the monitoring device 400 may transmit information indicating the occurrence of an event (particular user recognition) to corresponding IoT devices such that the corresponding IoT devices respectively perform operations corresponding to the recognized particular user. The corresponding IoT devices may respectively perform preset operations based on the received information. For example, the audio equipment 520 may play music corresponding to the recognized particular user, a lighting device 550 may be turned on with brightness corresponding to the recognized particular user, and/or an air conditioner 560 may set a desired temperature to a temperature corresponding to the recognized particular user.

The monitoring device 400 may detect by using the human body detection sensor 430. When (or based on) a human body is detected, the monitoring device 400 may transmit information indicating the occurrence of an event to the lighting device 550, the TV, and/or the audio equipment 520. Based on the received information, the lighting device 550, the TV, and/or the audio equipment 520 may perform a turn-on operation.

Alternatively, when a human body is detected, the monitoring device 400 may transmit information indicating the occurrence of an event to the camera 410 and the cellular phone 530, and the cellular phone 530 may transmit a text message or an image captured by the camera 410 to a preset external device.

When no human body is detected for a preset time or more, the monitoring device 400 may transmit information indicating the occurrence of an event to the lighting device 550 and the TV, and the lighting device 550 and the TV may perform a turn-off operation.

According to an embodiment, the monitoring device 400 may detect an illuminance by using the illuminance sensor 440. When the illuminance is detected to be brighter than a preset illuminance, the monitoring device 400 may transmit information indicating the occurrence of an event to the lighting device 550 and/or an electromotive curtain. Based on the received information, the lighting device 550 may be turned off or adjust the illuminance to be darker, and/or the electromotive curtain may perform a curtain closing operation.

Further, when the illuminance is detected to be darker than the preset illuminance (or a different preset illuminance value0, the monitoring device 400 may transmit information indicating the occurrence of an event to the lighting device 550 and/or the electromotive curtain. Based on the received information, the lighting device 550 may be turned on or adjust the illuminance to be brighter, and/or the electromotive curtain may perform a curtain opening operation.

According to an embodiment, the monitoring device 400 may detect a temperature by using the temperature sensor 450. When the temperature is detected to be higher or lower than a preset temperature (or higher than a first preset temperature and lower than a second preset temperature), the monitoring device 400 may transmit information indicating the occurrence of an event to at least one of the air conditioner 560, an electric fan, a stove, a heater, etc. The conditioner 560, the electric fan, the stove, the heater, etc., may be turned on/off and/or set an appropriate temperature based on the received information.

According to an embodiment, the monitoring device 400 may collect current time information. When it becomes a preset time, the monitoring device 400 may transmit information indicating the occurrence of an event (e.g., reaching the preset time) to corresponding IoT devices such that the corresponding IoT devices respectively perform operations corresponding to the preset time. The corresponding IoT devices may respectively perform preset operations based on the received information. For example, the electromotive curtain may perform the curtain opening operation, the TV may be turned on, a robot cleaner 540 may perform a cleaning operation, and the audio equipment 520 may perform an operation of playing music.

According to an embodiment, the monitoring device 400 may detect an operation of a microwave oven. When the microwave oven operates, the monitoring device 400 may transmit information indicating the occurrence of an event to a ventilating fan. The ventilating fan may operate based on the received information. Further, when the operation of the microwave oven ends because cooking is finished, the ventilating fan may stop the operation.

According to an embodiment, the interactive system is not limited to the examples described with reference to FIG. 19. The examples described with reference to FIG. 19 are only illustrative, and the interactive system may be implemented in variously modified or applied forms according to various embodiments. Further, while in the above-described embodiment, the monitoring device 400 transmits the information indicating the occurrence of the event (or a control signal) to the IoT device(s), it is understood that one or more other embodiments are not limited thereto. For example, in one or more other embodiments, the monitoring device 400 may transmit the information or control information or signals to an intervening device, such as a controller (e.g., a smart home controller, a Zigbee controller, a Z-wave controller, an IoT device controller, a third-party controller), a bridge, a gateway, a server, etc.

Figure 20:
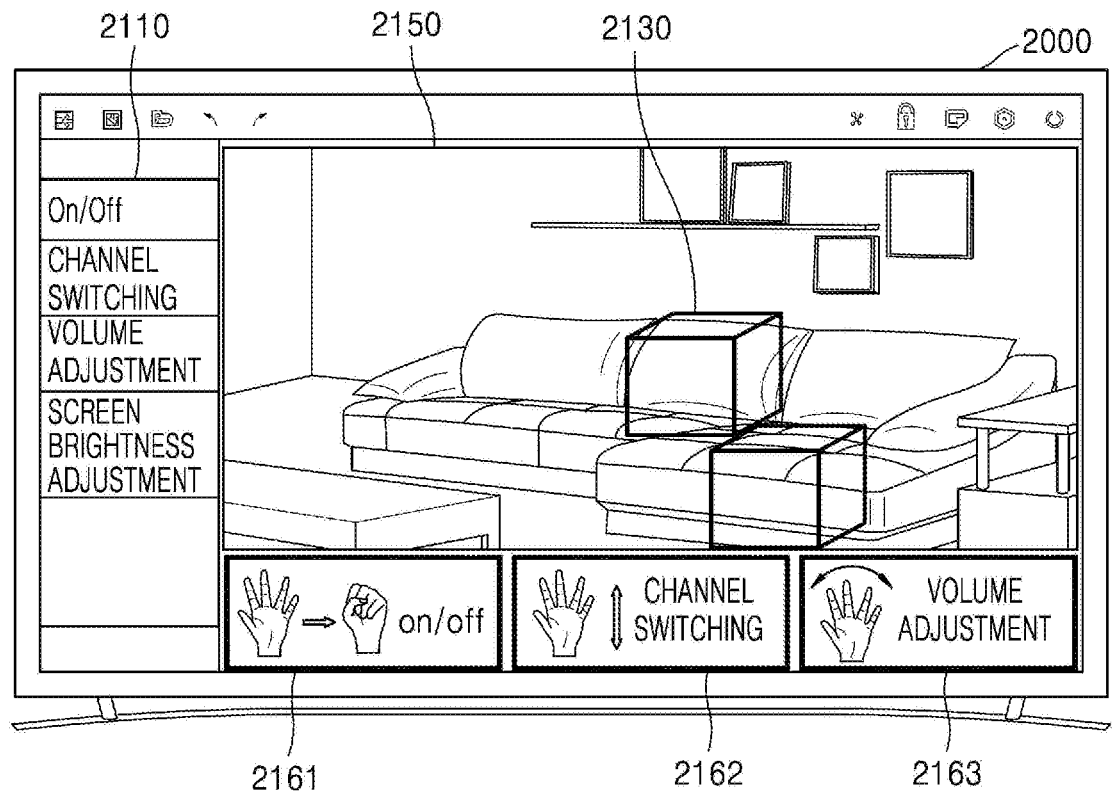
FIG. 20 illustrates a method, performed by a display device, of setting an interactive region, according to an embodiment.
Figure 20:
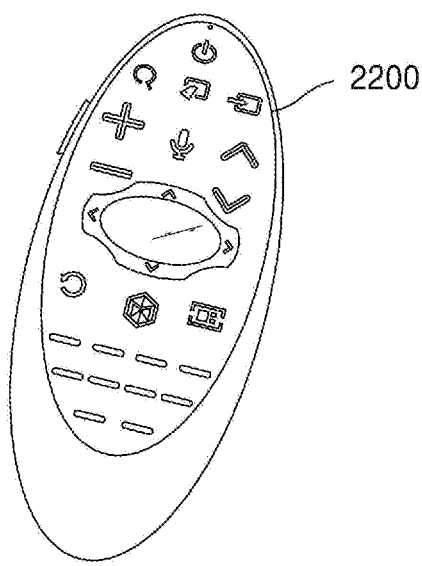

FIG. 20 illustrates a method, performed by a display device 2000, of setting an interactive region, according to an embodiment.

According to an embodiment, the operations of setting an interactive region, the operations of setting content corresponding to an interactive region, the operations of setting tag information to an interactive region, and/or the operations of storing an interactive region, which are shown in and have been described with reference to FIGS. 6, 7, 8A, 8B, 9A, 9B, 10 to 13, 14A, and 14B, may be performed by the display device 2000.

Referring to FIG. 20, the display device 2000 may display, on a display, an image 2110 by photographing (e.g., capturing an image of) an actual space to be monitored. The image 2110 obtained by photographing the actual space to be monitored may be received from an external device or captured by the display device 2000. In addition, the image 2110 obtained by photographing the actual space may include at least one object and may include depth value information of objects.

The display device 2000 may generate a 3D box based on at least one point or object included in an image. In this case, the display device 2000 may receive, from a control device 2200, at least one of an input for selecting any one point included in the image, a drag input from any one point to another point on the image, an input for selecting an object included in the image, etc.

According to an embodiment, the control device 2200 may be implemented by various types of devices for controlling the display device 2000, such as a remote control or a cellular phone. In addition, the control device 2200 may control the display device 2000 by using a short-range communication scheme including an infrared communication scheme, a Bluetooth communication scheme, a limited location (or distance) communication scheme, etc. The control device 2200 may control a function of the display device 2000 by using at least one of a key (including a hard key button, a soft key, a scroll wheel, a rotatable dial, etc.), a touchpad, a microphone capable of receiving a voice of a user, a sensor capable of recognizing a motion of the control device 2200, etc.

In addition, the display device 2000 may display a generated 3D box 2130. The display device 2000 may adjust at least one of a view angle of the displayed image 2110 and a size and a position of the 3D box 2130 based on a user input received from the control device 2200 (e.g., similar to the above description with reference to FIGS. 7, 8A, 8B, 9A, and 9B).

Figure 21:
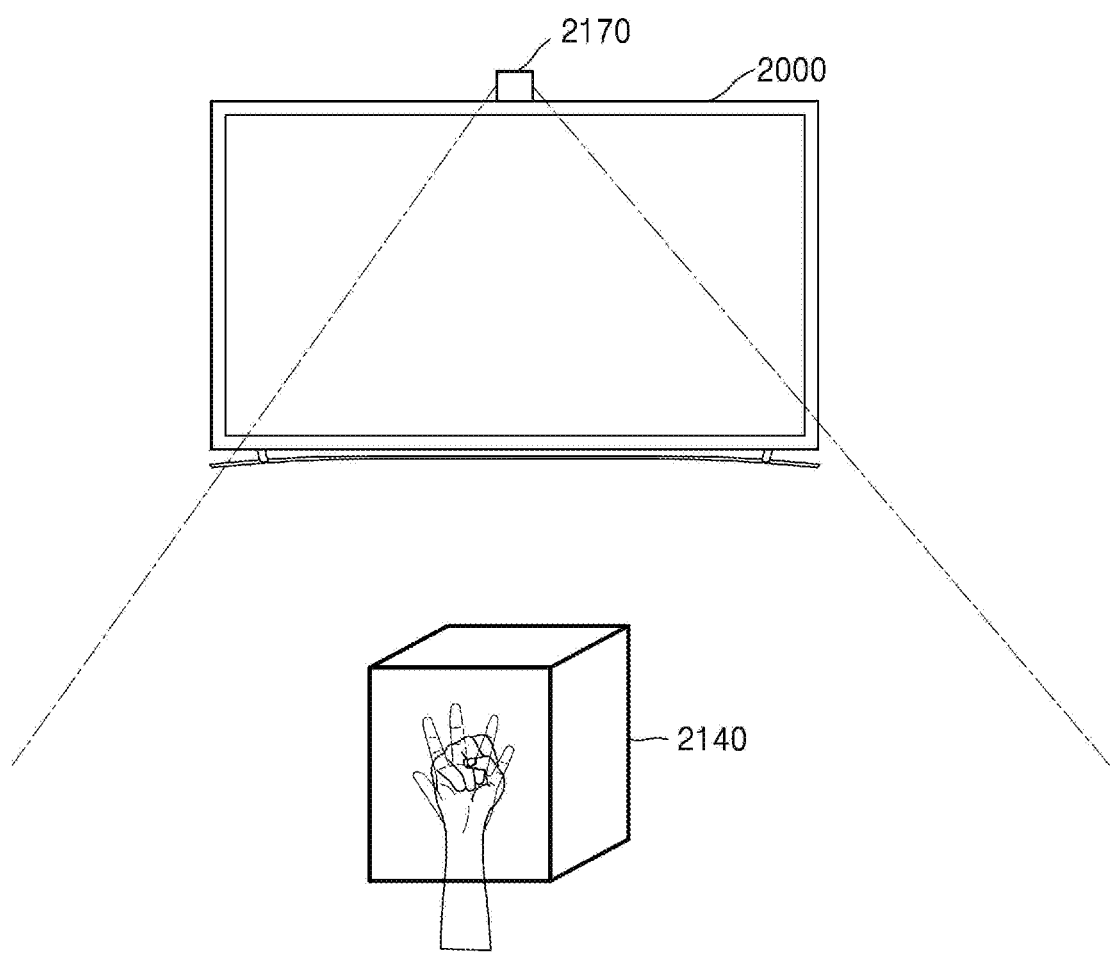
FIG. 21 illustrates an operation of the display device, according to an embodiment.

The display device 2000 may control so as to set, in an actual space, an interactive region corresponding to the 3D box 2130. For example, as shown in FIG. 21, an interactive region 2140 corresponding to the 3D box 2130 may be set in the actual space.

In addition, when the 3D box 2130 is set, the display device 2000 may set an event corresponding to the 3D box 2130 and an operation to be executed when (or based on) the event is detected. The display device 2000 may set an event in which a particular motion (gesture) is detected, an event in which a certain object is detected, an event in which a certain object is not detected, etc., as the event corresponding to the 3D box 2130, though it is understood that the event corresponding to the 3D box 2130 is not limited thereto.

For example, as shown in FIG. 20, the display device 2000 may set an event in which a particular motion is detected as the event corresponding to the 3D box 2130. For example, the particular motion may include a first motion of opening and then clenching a hand to make a fist, a second motion of opening and then moving a hand downward and upward, and a third motion of opening and then shaking a hand to the left and right.

In addition, the display device 2000 may set a power on/off operation, a channel switching operation, a volume adjustment operation, a screen brightness adjustment operation, or the like as an operation to be executed when an event (e.g., a corresponding event for each of the operations or for any combination of the operations) is detected in the interactive region corresponding to the 3D box 2130, though it is understood that the operation to be executed when (or based on) an event is detected in the interactive region corresponding to the 3D box 2130 is not limited thereto. By way of example, the display device 2000 may display a list 2150, and a user may set execution operations respectively corresponding to a plurality of events by a drag and drop input of an item to regions 2161, 2162, and 2163 respectively corresponding to the plurality of events. It is understood that one or more other embodiments are not limited thereto, and any manner of allowing a user to select or set execution operations (e.g., a drop-down menu, a manual input field, etc.) respectively corresponding to a plurality of events may be implemented.

As shown in FIG. 20, the display device 2000 may set the power on/off operation to the first motion, the channel switching operation to the second motion, and the volume adjustment operation to the third motion.

FIG. 21 illustrates an operation of the display device 2000, according to an embodiment.

The display device 2000 may determine the interactive region 2140 corresponding to a generated 3D box in an actual space based on coordinate value information of the 3D box, and monitor whether an event occurs in the interactive region 2140, based on event information set to the 3D box. According to an embodiment, the display device 2000 may include a motion sensor 2170 and detect a particular motion in the interactive region 2140 by using the motion sensor 2170. When an event (e.g., the particular motion) is detected in the interactive region 2140, the display device 2000 may perform a corresponding operation based on execution operation information set to the 3D box.

For example, when a first motion (e.g., a motion of opening and then clenching a hand to make a fist) is detected in the interactive region 2140, the display device 2000 may perform a first operation (e.g., be turned on or off or change a power state). In addition, when a second motion (e.g., a motion of opening and then moving a hand upward and downward) is detected in the interactive region 2140, the display device 2000 may perform a second operation (e.g., switch a current channel to another channel, perform a channel zapping operation, a previous channel operation, change of source input operation, etc.).

Figure 22:
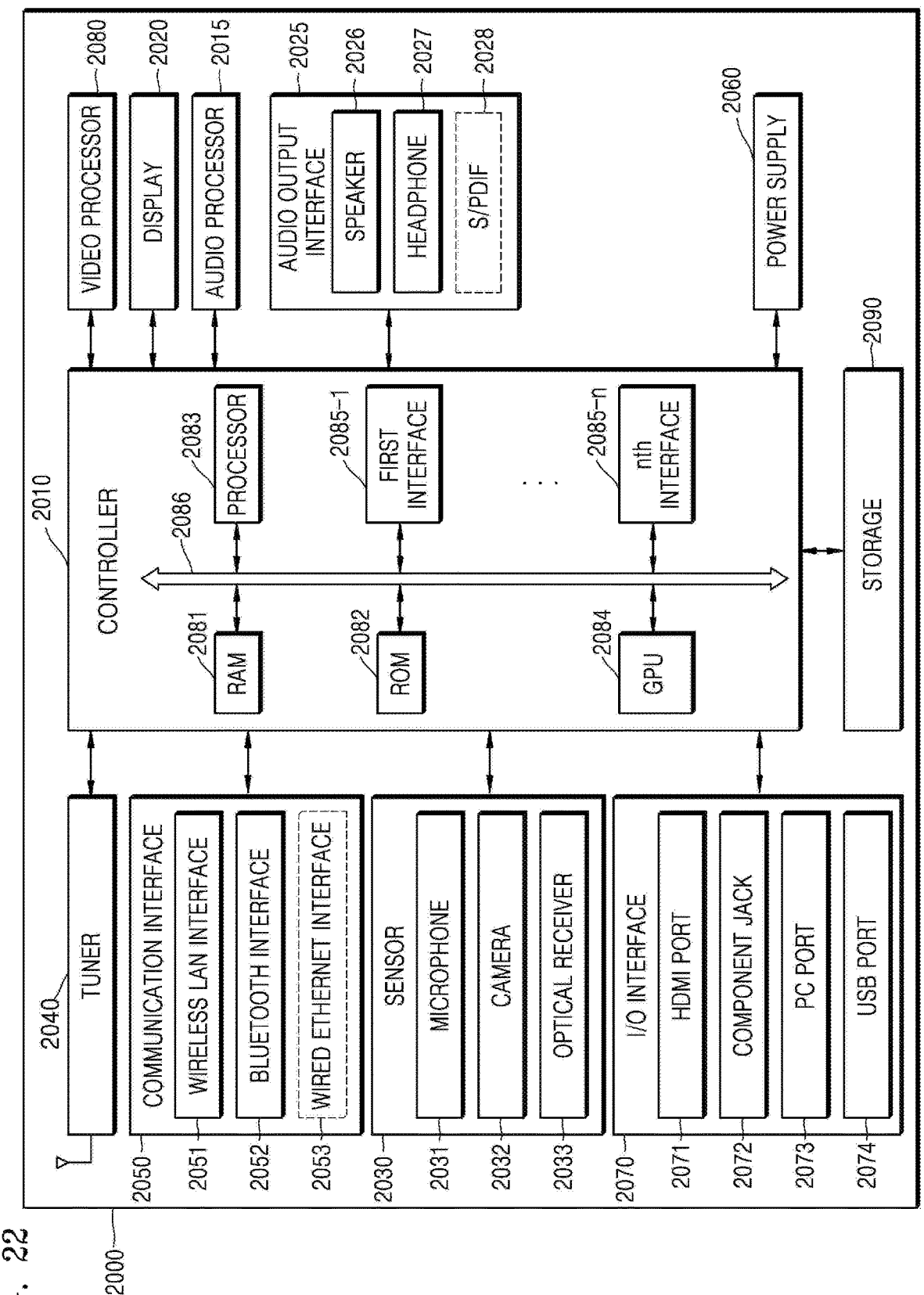
FIG. 22 is a block diagram of the display device according to an embodiment.

FIG. 22 is a block diagram of the display device 2000 according to an embodiment.

Referring to FIG. 22, the display device 2000 according to an embodiment may include a tuner 2040, a controller 2010, a display 2020, a communication interface 2050, a sensor 2030, a video processor 2080, an audio processor 2015, an audio output interface 2025, a power supply 2060, an input/output (I/O) interface 2070, and a storage 2090.

The tuner 2040 may tune and select only a frequency of a channel that the display device 2000 (or a user of the display device 2000) desires to receive from among a number of frequency components through amplification, mixing, resonance, and the like of a broadcast signal received in a wired or wireless manner. The broadcast signal includes at least one of audio, video and additional information (e.g., electronic program guide (EPG)).

The tuner 2040 may receive a broadcast signal in a frequency band corresponding to a channel number according to a user input (e.g., a control signal received from the control device 2200, such as a channel number input, a channel up/down input, a channel input on an EPG screen image, etc.).

The tuner 2040 may receive broadcast signals from various sources such as terrestrial broadcasting stations, cable broadcasting stations, satellite broadcasting stations, and Internet broadcasting stations. The tuner 2040 may receive broadcast signals from sources such as analog broadcasting stations and/or digital broadcasting stations.

The communication interface 2050 may transmit and receive data or a signal to and from an external device or server under control of the controller 2010. The controller 2010 may transmit/receive content to/from the external device connected through the communication interface 2050, download an application from the external device, and/or perform web browsing through the communication interface 2050. The communication interface 2050 may transmit and receive data or a signal by at least one scheme of WLAN (e.g., Wi-Fi), Bluetooth, and wired Ethernet in correspondence with the performance and structure of the display device 2000.

The video processor 2080 processes video data received by the display device 2000. The video processor 2080 may perform various types of image processing, such as decoding, scaling, noise filtering, frame rate conversion, and/or resolution conversion of the video data.

The audio processor 2015 performs a process on audio data. The audio processor 2015 may perform, on the audio data, various processes, such as decoding, amplification, and/or noise filtering. Meanwhile, the audio processor 2015 may include a plurality of audio processing modules to process audio corresponding to a plurality of pieces of content.

The audio output interface 2025 outputs audio included in a broadcast signal received through the tuner 2040, according to control of the controller 2010. The audio output interface 2025 may output audio (for example, voice or sound) input through the communication interface 2050 or the input/output interface 2070. Also, the audio output interface 2025 may output audio stored in the storage 2090 according to control of the controller 2010. The audio output interface 2025 may include at least one of a speaker 2026, a headphone output terminal 2027, and a Sony/Philips digital interface (S/PDIF) 2028. The audio output interface 2025 may include a combination of the speaker 2026, the headphone output terminal 2027, and the S/PDIF output terminal 2028.

The power supply 2060 supplies power received from an external power source to components in the display device 2000, according to control of the controller 2010. Also, the power supply 2060 may supply power output from one or more internal power sources (e.g., batteries) provided inside the display device 2000 to the components according to control of the controller 2010.

The sensor 2030 may receive an optical signal (e.g., a control signal) received from an external control device, through a light window of a bezel in the display 2020 or the like. The sensor 2030 may receive an optical signal corresponding to a user input (e.g., a touch, a push, a touch gesture, a voice, or a motion) from the control device 2200. The controller 2010 may extract a control signal from a received optical signal. In addition, the sensor 2030 may detect a voice of a user, an image of the user, and/or an interaction of the user. According to an embodiment, the sensor 2030 may include a microphone configured to receive a voice uttered by the user. The microphone may convert the received voice into an electrical signal and output the electrical signal to the controller 2010.

In addition, according to an embodiment, the sensor 2030 may detect a user input and transmit the detected signal to the controller 2010. For example, the sensor 2030 may detect a user input such as channel-up/down, power on/off, channel selection, and/or screen image configuration from the control device 2200. In addition, according to an embodiment, the sensor 2030 may detect an input of pressing a channel-up key or a channel-down key included in the control device 2200, an input of long-pressing the channel-up key or the channel-down key, an input of releasing the channel-up key or the channel-down key, etc.

The sensor 2030 detects voice of a user, an image of the user, and/or an interaction (e.g., predetermined or particular motion or pattern of motions) of the user.

A microphone 2031 receives a voice uttered by the user. The microphone 2031 may convert the received voice into an electric signal and output the electric signal to the controller 2010. The voice may include, for example, a voice input corresponding to a menu or function of the display device 2000. The microphone 2031 may be integrated with or separated from the display device 200. When the microphone 2031 is separated from the display device 2000, the microphone 2031 may be electrically or wirelessly connected to the display device 2000 through the communication interface 2050 or the input/output interface 2070.

It is understood that the microphone 2031 may be omitted based on a performance and a structure of the display device 2000.

A camera 2032 receives an image corresponding to motion of the user including a gesture within a camera recognition range (for example, continuous frames). Examples of the motion include motion of a part of a body of the user, such as a face, a face forming an expression, a hand, a hand making a fist, a finger pointing, a finger, etc. The camera 2032 may convert the received image into an electric signal and output the electric signal to the controller 2010 according to control of the controller 2010.

The controller 2010 may select a menu displayed in the display device 2000 or perform a result of recognizing motion, by using the result of recognizing the motion, for example, adjust a channel, adjust volume, move an indicator, and/or move a cursor.

The camera 2032 may include a lens and an image sensor. The camera 2032 may support an optical zoom or a digital zoom by using a plurality of lenses and image processing. A recognition range of the camera 2032 may be variously set based on an angle of a camera and surrounding conditions. When the camera 2032 includes a plurality of cameras, a three-dimensional (3D) still image or 3D motion may be received by using the plurality of cameras.

The camera 2032 may be integrated with or separated from the display device 2000. A separate device including the camera 2032 separated from the display device 2000 may be electrically or wirelessly connected to the display device 2000 through the communication interface 2050 or the I/O interface 2070.

It is understood that the camera 2032 may be omitted based on a performance and a structure of the display device 2000.

An optical receiver 2033 receives an optical signal (e.g., a control signal) from an external control device through an optical window of a bezel of the display 2020. The optical receiver 2033 may receive, from the external control device, an optical signal corresponding to a user input, for example, a touch, pressing, a touch gesture, voice, or motion). A control signal may be extracted from the optical signal according to control of the controller 2010.

The I/O interface 2070 receives video (for example, a moving image), audio (for example, voice or music), and/or additional information (for example, EPG) from an external source of the display device 2000, according to control of the controller 2010. The I/O interface 2070 may include one of HDMI port 2071, a component jack 2072, a personal computer (PC) port 2073, and a universal serial bus (USB) port 2074. The I/O interface 2070 may include a combination of the HDMI port 2071, the component jack 2072, the PC port 2073, and the USB port 2074.

It is understood that the I/O interface 2070 may be omitted based on a performance and a structure of the display device 2000.

The controller 2010 controls a general operation of the display device 2000 and a signal flow between the internal components 2010 to 2090 of the display device 2000 and processes data. When an input of the user exists, or a previously set and stored condition is satisfied, the controller 2010 may execute an operating system (OS) and various applications stored in the storage 2090.

The controller 2010 may include a random access memory 2081 used to store a signal or data received from an external source of the display device 2000 or used as a storage area of various operations performed by the display device 2000, a read-only memory (ROM) 2072 in which a control program for controlling the display device 2000 is stored, and a processor 2083.

The processor 2083 may include a graphics processing unit (GPU) 2084 for performing a graphic process on a video. The processor 2083 may be realized as a system-on-chip (SoC) in which a core and the GPU 2084 are integrated.

The GPU 2084 generates a screen including various objects, such as an icon, an image, and text, by using an operator and a renderer. The operator calculates an attribute value, such as a coordinate value, a shape, a size, and/or a color, of each object according to a layout of the screen, by using a user input detected through the sensor 2030. The renderer generates the screen having any one of various layouts including the objects based on the attribute values calculated by the operator. The screen generated by the renderer is displayed in a display region of the display 2020.

First through n-th interfaces 2085-1 through 2085-n are connected to various components described above. One of the first through n-th interfaces 2085-1 through 2085-n may be a network interface connected to an external device through a network.

The RAM 2081, the ROM 2082, the processor 2083, the GPU 2084, and the first through n-th interfaces 2085-1 through 2085-n may be connected to each other through an internal bus 2086.

The term "controller of a display device" in the current embodiment includes the processor 2083, the ROM 2082, and the RAM 2081.

The display 2020 generates a driving signal by converting an image signal, a data signal, an OSD signal, a control signal, or the like processed by the controller 2010. The display 2020 may be implemented by a PDP, an LCD, an OLED, a flexible display, etc., and may also be implemented by a 3D display. Further, the display 2020 may be used as an input device in addition to an output device by being configured with a touch screen.

The storage 2090 may store various data, programs, and/or applications for operating and controlling the display device 2000 under control of the controller 2010. The storage 2090 may include a broadcast reception module, a channel control module, a volume control module, a communication control module, a voice recognition module, a motion recognition module, an optical reception module, a display control module, an audio control module, an external input control module, a power control module, a module for controlling power of an external device connected in a wireless manner (e.g., Bluetooth), a voice database (DB), and/or a motion DB. The modules and DBs of the storage 2090 may be implemented in a software format to perform a broadcast reception control function, a channel control function, a volume control function, a communication control function, a voice recognition function, a motion recognition function, an optical reception control function, a display control function, an audio control function, an external input control function, a power control function, and/or a function of controlling power of an external device connected in a wireless manner (e.g., Bluetooth), The controller 2010 may perform each function by using the software stored in the storage 2090.

The block diagram of the display device 2000, which is shown in FIG. 22, is only illustrative. Each component in the block diagram may be integrated, added, or omitted according to actually implemented specifications or designs of the display device 2000. That is, according to circumstances, two or more components may be integrated into one component, one component may be separated into two or more components, and/or one or more components may be omitted. In addition, the functions performed in each block are to describe embodiments, and detailed operations or devices thereof are not limited.

The operating method of an electronic device, according to an embodiment, may be implemented as computer commands that may be executed by various computer means, and recorded on a non-transitory computer-readable recording medium. The non-transitory computer-readable recording medium may include program commands, data files, and data structures, taken alone or in combination. The program commands recorded on the non-transitory computer-readable recording medium may be specially designed and constructed for the disclosure or may be known to and usable by those of ordinary skill in a field of computer software. Examples of the non-transitory computer-readable medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level language code that may be executed by a computer using an interpreter as well as a machine language code made by a compiler.

In addition, the electronic device and/or the operating method of the electronic device, according to embodiments, may be provided by being included in a computer program product. The computer program product may be traded between a seller and a purchaser.

The computer program product may include a software (S/W) program, a non-transitory computer-readable storage medium in which the S/W program is stored. For example, the computer program product may include a S/W program form of product (e.g., a downloadable application) electronically distributed through a manufacturer of the electronic device or an electronic market (e.g., GOOGLE PLAYSTORE, or App Store). For the electronic distribution, at least a portion of the S/W program may be stored in a storage medium or temporarily generated. In this case, the storage medium may be included in a server of the manufacturer, a server of the electronic market, or a relay server configured to temporarily store the S/W program.

The computer program product may include a storage medium of a server or a storage medium of a client device in a system including the server and the client device. Alternatively, when a third device (e.g., a smartphone) connected to the server or the client device through communication exists, the computer program product may include a storage medium of the third device. Alternatively, the computer program product may include the S/W program to be transmitted from the server to the client device or the third device or transmitted from the third device to the client device.

In this case, one of the server, the client device, and the third device may execute the computer program product and perform the methods according to the embodiments. Alternatively, two or more of the server, the client device, and the third device may execute the computer program product and perform the methods according to embodiments in a distributed fashion.

For example, the server (e.g., a cloud server, an artificial intelligence server, or the like) may execute the computer program product stored therein to control the client device connected to the server through communication such that the client device performs the methods according to embodiments.

An electronic device according to an embodiment may improve use convenience of a user by providing a user interface by which the user may easily set an interactive region.

An electronic device according to an embodiment may improve use convenience of a user by providing a user interface by which the user may easily set or change content corresponding to an interactive region.

It should be understood that embodiments described herein should be considered in a descriptive sense only and not for purposes of limitation. Descriptions of features or aspects within each embodiment should typically be considered as available for other similar features or aspects in other embodiments.

While embodiments have been described with reference to the figures, it will be understood by those of ordinary skill in the art that various changes in form and details may be made therein without departing from the spirit and scope as defined (at least in part) by the following claims.

What is claimed is:

1. An electronic device comprising:
a display;
a user input interface;
a memory configured to store one or more instructions; and
at least one processor configured to execute the one or more instructions stored in the memory, to:
control to display, on the display, a captured image of a physical space to be monitored,
determine a three-dimensional (3D) box based on at least one point included in the captured image,
adjust at least one of a size and a position of the 3D box based on a user input received through the user input interface, and
set an interactive region, in the physical space, corresponding to the 3D box, and
set content to be executed or output based on an event being detected in the interactive region, set in the physical space, corresponding to the 3D box.

2. The electronic device of claim 1, further comprising a communication interface configured to receive the captured image from an external device.

3. The electronic device of claim 1, wherein:
the user input interface is configured to receive an input for selecting at least one object included in the captured image displayed on the display; and
the at least one processor is further configured to execute the one or more instructions to determine the 3D box based on a size and a position of the selected at least one object.

4. The electronic device of claim 1, wherein:
the captured image displayed on the display comprises an image obtained by three-dimensionally rendering the captured image of the physical space; and
the at least one processor is further configured to execute the one or more instructions to adjust a view angle of the captured image displayed on the display based on a user input of a drag on the captured image displayed on the display.

5. The electronic device of claim 1, wherein the at least one processor is further configured to execute the one or more instructions to:
control to display, on the display, a background image lock icon; and
fix a view angle of the captured image displayed on the display based on a user input for selecting the background image lock icon.

6. The electronic device of claim 1, wherein the at least one processor is further configured to execute the one or more instructions to control to display the 3D box and to display, relative to at least one of a plurality of surfaces of the displayed 3D box, a horizontal/vertical size adjustment object for adjusting a size of the 3D box and a rotational adjustment object for rotating the 3D box.

7. The electronic device of claim 1, wherein the at least one processor is further configured to execute the one or more instructions to control to set, in the physical space, sub-interactive regions respectively corresponding to a plurality of pieces of content based on the set content for the interactive region comprising the plurality of pieces of content.

8. The electronic device of claim 1, wherein the at least one processor is further configured to execute the one or more instructions to set at least one piece of tag information corresponding to the 3D box, and control to transmit the at least one piece of tag information to an external device based on the event being detected in the interactive region.

9. An operating method of an electronic device, the operating method comprising:
controlling to display, on a display, a captured image of a physical space to be monitored;
determining a three-dimensional (3D) box based on at least one point included in the captured image;
adjusting at least one of a size and a position of the 3D box based on a user input;
setting, in the physical space, an interactive region corresponding to the 3D box, and
setting content to be executed or output based on an event being detected in the interactive region, set in the physical space, corresponding to the 3D box.

10. The operating method of claim 9, further comprising receiving the captured image from an external device.

11. The operating method of claim 9, further comprising receiving an input for selecting at least one object included in the captured image displayed on the display,
wherein the determining of the 3D box comprises determining the 3D box based on a size and a position of the selected at least one object.

12. The operating method of claim 9, wherein:
the captured image displayed on the display comprises an image obtained by three-dimensionally rendering the captured image of the physical space; and
the operating method further comprises adjusting a view angle of the captured image displayed on the display based on a user input of a drag on the captured image displayed on the display.

13. The operating method of claim 9, further comprising:
controlling to display, on the display, a background image lock icon; and
fixing a view angle of the captured image displayed on the display based on a user input for selecting the background image lock icon.

14. The operating method of claim 9, further comprising displaying the 3D box and displaying, relative to at least one of a plurality of surfaces of the displayed 3D box, a horizontal/vertical size adjustment object for adjusting a size of the 3D box and a rotation adjustment object for rotating the 3D box.

15. The operating method of claim 9, further comprising setting, in the physical space, sub-interactive regions respectively corresponding to a plurality of pieces of content based on the set content for the interactive region comprising the plurality of pieces of content.

16. The operating method of claim 9, further comprising:
setting at least one piece of tag information corresponding to the 3D box; and
controlling to transmit the at least one piece of tag information to an external device based on the event being detected in the interactive region.

17. A non-transitory computer-readable recording medium having recorded thereon a program for executing, in a computer, the operating method of claim 9.

* * * * *